(12) United States Patent
Hamaguchi et al.

(10) Patent No.: US 12,110,176 B2
(45) Date of Patent: Oct. 8, 2024

(54) ARTICLE STORAGE FACILITY

(71) Applicant: Daifuku Co., Ltd., Osaka (JP)

(72) Inventors: Jun Hamaguchi, Hinocho (JP); Rikiya Kanai, Osaka (JP); Hirotaka Takenoshita, Hinocho (JP); Toshiyuki Yokohara, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 857 days.

(21) Appl. No.: 17/198,580

(22) Filed: Mar. 11, 2021

(65) Prior Publication Data

US 2021/0284443 A1 Sep. 16, 2021

(30) Foreign Application Priority Data

Mar. 13, 2020 (JP) .................................. 2020-044038

(51) Int. Cl.
*B65G 1/04* (2006.01)
*B65G 1/137* (2006.01)

(52) U.S. Cl.
CPC ......... *B65G 1/0421* (2013.01); *B65G 1/0428* (2013.01); *B65G 1/0464* (2013.01); *B65G 1/1371* (2013.01); *B65G 1/1375* (2013.01); *B65G 2201/0235* (2013.01)

(58) Field of Classification Search
CPC .. B65G 1/0421; B65G 1/0428; B65G 1/0464; B65G 1/1371; B65G 1/1375; B65G 2201/0235
See application file for complete search history.

(56) References Cited

U.S. PATENT DOCUMENTS

| | | | |
|---|---|---|---|
| 6,785,624 B2 * | 8/2004 | Stengele ................ | B25J 9/1692 700/254 |
| 8,803,055 B2 * | 8/2014 | Lau ......................... | G01S 17/88 356/152.3 |
| 10,030,972 B2 * | 7/2018 | Iseli ...................... | G01B 21/042 |
| 10,464,786 B2 | 11/2019 | Miyoshi et al. | |

(Continued)

FOREIGN PATENT DOCUMENTS

JP 2001301922 A * 10/2001
JP 6347333 B2 6/2018

*Primary Examiner* — Saul Rodriguez
*Assistant Examiner* — Ashley K Romano
(74) *Attorney, Agent, or Firm* — The Webb Law Firm

(57) ABSTRACT

An article storage facility is disclosed that is capable of performing an appropriate transport operation on a container group even when a container group that includes a plurality of containers in a stacked state is placed on a placement surface in an inclined state. The control device performs inclination computation processing to obtain a placement inclination θ that is an inclination of a container group Cg placed on a placement surface F relative to a Z direction, based on coordinate information, bottom surface dimension information, and container group position information that are stored in a storage unit, and individual position computation processing to obtain individual position information that indicates a position, in X and Y directions, of each of the containers C in the tiers included in the container group Cg, based on the container group position information, the placement inclination θ, and the height dimension information, and controls a movement mechanism based on the individual position information.

8 Claims, 12 Drawing Sheets

(56) References Cited

U.S. PATENT DOCUMENTS

| | | | |
|---|---|---|---|
| 10,988,311 B2* | 4/2021 | Hendrix | B65G 1/0428 |
| 2014/0017052 A1* | 1/2014 | Honkanen | B65G 1/0421 |
| | | | 414/626 |

* cited by examiner

Fig.3
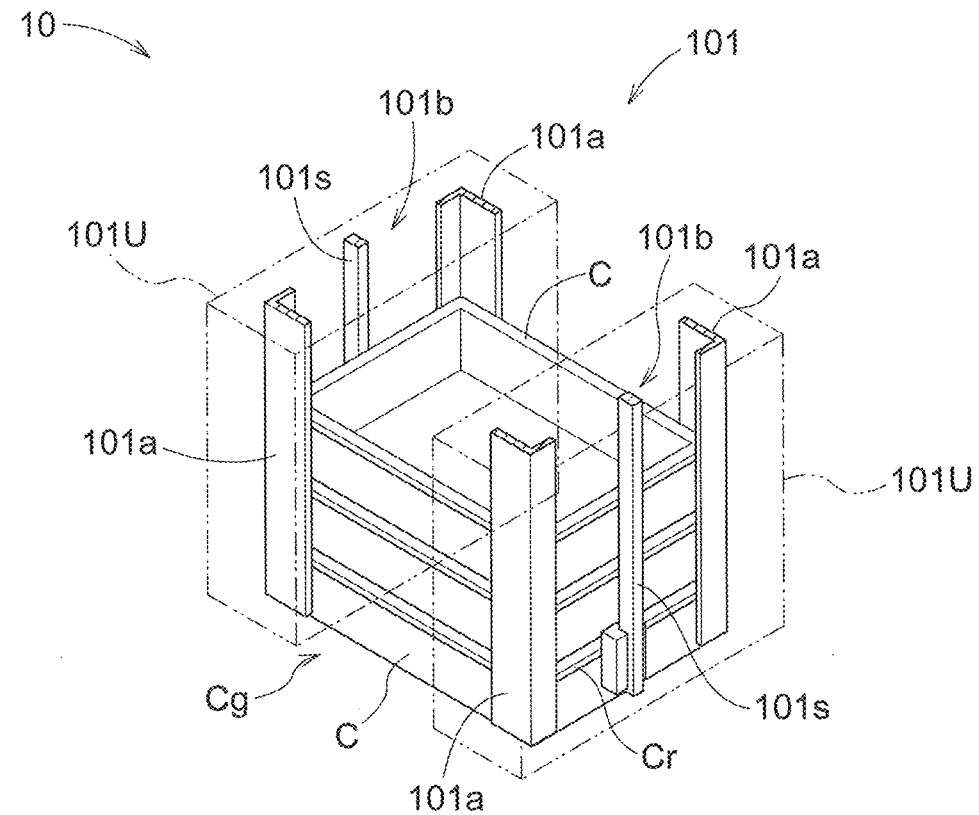
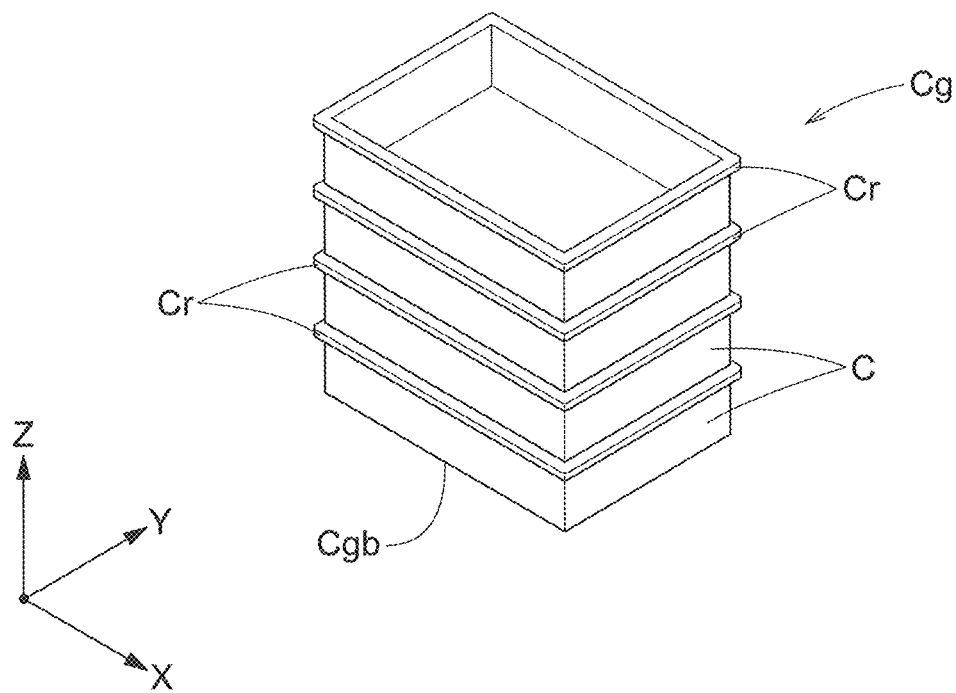

$$\frac{\Delta Z}{\Delta L} = \tan\alpha \quad \cdots\cdots\cdots\cdots (1)$$

$$\alpha = \arctan\frac{\Delta Z}{\Delta L} = \theta \quad \cdots\cdots (2)$$

$$Cv = \frac{mCh}{\sin\theta} \quad \cdots\cdots\cdots\cdots\cdots (3)$$

ARTICLE STORAGE FACILITY

CROSS-REFERENCE TO RELATED APPLICATION

This application claims priority to Japanese Patent Application No. 2020-044038 filed Mar. 13, 2020, the disclosure of which is hereby incorporated by reference in its entirety.

BACKGROUND OF THE INVENTION

1. Field of the Invention

The present invention relates to an article storage facility including: a transport device that transports a container; and a control device that controls the transport device, the article storage facility placing and storing a container group including a plurality of containers in a stacked state, on a placement surface that constitutes a storage location.

2. Description of Related Art

One example of such an article storage facility is disclosed in Japanese Patent No. 6347333 (Patent Document 1). Hereinafter, reference signs shown in parentheses in the description of the background of the invention are those used in Patent Document 1.

The article storage facility disclosed in Patent Document 1 includes a transport device (2) that performs a transport operation for approaching, from above, a container (C) placed on a placement surface (1) that is set in a predetermined area of a facility floor, and lifting the container (C), or a transport operation for placing another container (C) on the container (C) to set a plurality of containers (C) in a stacked state. The transport device (2) performs a transport operation on the container (C) placed on the placement surface (1) by lifting and lowering a gripping unit (7A, 7B) for gripping the container (C), in a top-bottom direction. Ideally, it is preferable that the placement surface (1) on which the container (C) is placed is an entirely flat surface. However, in reality, the floor of the building where the facility is installed and the surface of a support platform installed on the floor are not completely horizontal planes, and, in most cases, the height of the placement surface (1) slightly varies depending on the location. In such cases, the optimum distance by which the gripping unit (7A, 7B) is lifted or lowered by the transport device (2) varies depending on the point where the container (C) to be transported is placed.

Therefore, according to the article storage facility disclosed in Patent Document 1, the height is measured in advance at a plurality of points on the placement surface (1), and the distance by which the gripping unit (7A, 7B) is lifted or lowered by the transport device (2) is corrected according to the position on the placement surface (1) based on the measured height. As a result, even if the height of the placement surface (1) varies depending on the position thereof, it is possible to perform an appropriate transport operation on the container (C) at any position on the placement surface (1).

SUMMARY OF THE INVENTION

When the placement surface (1) in a location where the container (C) is placed is inclined, the container (C) is also inclined according to the inclination of the placement surface (1). When a container group including a plurality of containers (C) in a stacked state is placed on such an inclined placement surface (1), a displacement in a horizontal direction relative to the bottom surface increases in an upward direction. Therefore, if the gripping position in the horizontal direction at which the gripping unit (7A, 7B) grips a container (C) is the same for a container (C) at a lower position and a container (C) at a higher position, it may be impossible to perform an appropriate transport operation. However, Patent Document 1 does not specifically disclose such a point.

In view of the above situation, there is desire to realize an article storage facility that is capable of performing an appropriate transport operation on a container group even when a container group that includes a plurality of containers in a stacked state is placed on a placement surface in an inclined state.

An article storage facility according to the present disclosure is an article storage facility including: a transport device that transports a container; and a control device that controls the transport device, the article storage facility placing and storing a container group including a plurality of containers in a stacked state, on a placement surface that constitutes a storage location, wherein the control device includes a storage unit, the storage unit stores coordinate information that indicates an actual position of each of a plurality of points on the placement surface in an X direction, a Y direction, and a Z direction, bottom surface dimension information that indicates dimensions of the bottom surface of each of the containers in the X direction and the Y direction, height dimension information that indicates a height of each of the containers in the Z direction, container group position information that indicates the position of the container group in the X direction and the Y direction on the placement surface, and tier number information that indicates the number of tiers that is the number of containers included in the container group, where the X direction and the Y direction are directions that are parallel with a reference surface that is an ideal surface constituted by the placement surface, and are orthogonal to each other, and the Z direction is a direction that is orthogonal to the reference surface, the transport device includes a gripping unit that grips a single container or a plurality of containers in a stacked state, a movement mechanism that moves the gripping unit in the X direction and the Y direction, and a lifting/lowering mechanism that lifts and lowers the gripping unit in the Z direction, and the control device performs inclination computation processing to obtain a placement inclination that is an inclination of the container group placed on the placement surface relative to the Z direction, based on the coordinate information, the bottom surface dimension information, and the container group position information stored in the storage unit, and individual position computation processing to obtain individual-position information that indicates a position of each of the containers in the tiers included in the container group in the X direction and the Y direction, based on the container group position information, the placement inclination, and the height dimension information, and controls the movement mechanism based on the individual-position information.

With this configuration, when a container group is placed on any location of the placement surface, it is possible to grasp the position and the dimensions of the area of the placement surface occupied by the bottom surface of the container group, based on container group position information and bottom surface dimension information regarding the container group. In addition, the storage unit stores coordinate information regarding each of a plurality of points on the placement surface, more specifically information that indicates the actual positions of the plurality of points in the X, Y, and Z directions, and therefore it is possible to obtain the placement inclination that is an inclination of the container group placed on the placement surface relative to the Z direction, based on these pieces of information. Here, the placement inclination is the inclination of the entire container group, and regarding the position in the X and Y directions, a displacement in the X and Y directions relative to the bottom surface of the container group increase in an upward direction. With the present configuration, individual position computation processing is performed to obtain individual-position information that indicates the position of each of the containers in the tiers in the X and Y directions based on the above-described placement inclination and container group position information, and height dimension information regarding each of the containers in the tiers included in the container group. As a result, it is possible to grasp the actual position of each of the containers in the tiers included in the container group in the X and Y directions, as individual-position information. Thereafter, by controlling the movement mechanism based on the individual-position information, it is possible to accurately move the gripping unit according to the actual position of each of the containers in the tiers included in the container group in the X and Y directions, to perform a transport operation. Therefore, with the present configuration, even when a container group including a plurality of containers in a stacked state is placed on the placement surface in an inclined state, it is possible to perform appropriate transport operation on the container group.

Further features and advantages of the technology according to the present disclosure will be further clarified by the following illustration of exemplary and non-limiting embodiments described with reference to the drawings.

BRIEF DESCRIPTION OF THE DRAWINGS

FIG. 3 is a diagram showing operations of a gripping unit.

DETAILED DESCRIPTION OF THE INVENTION

Figure 1:
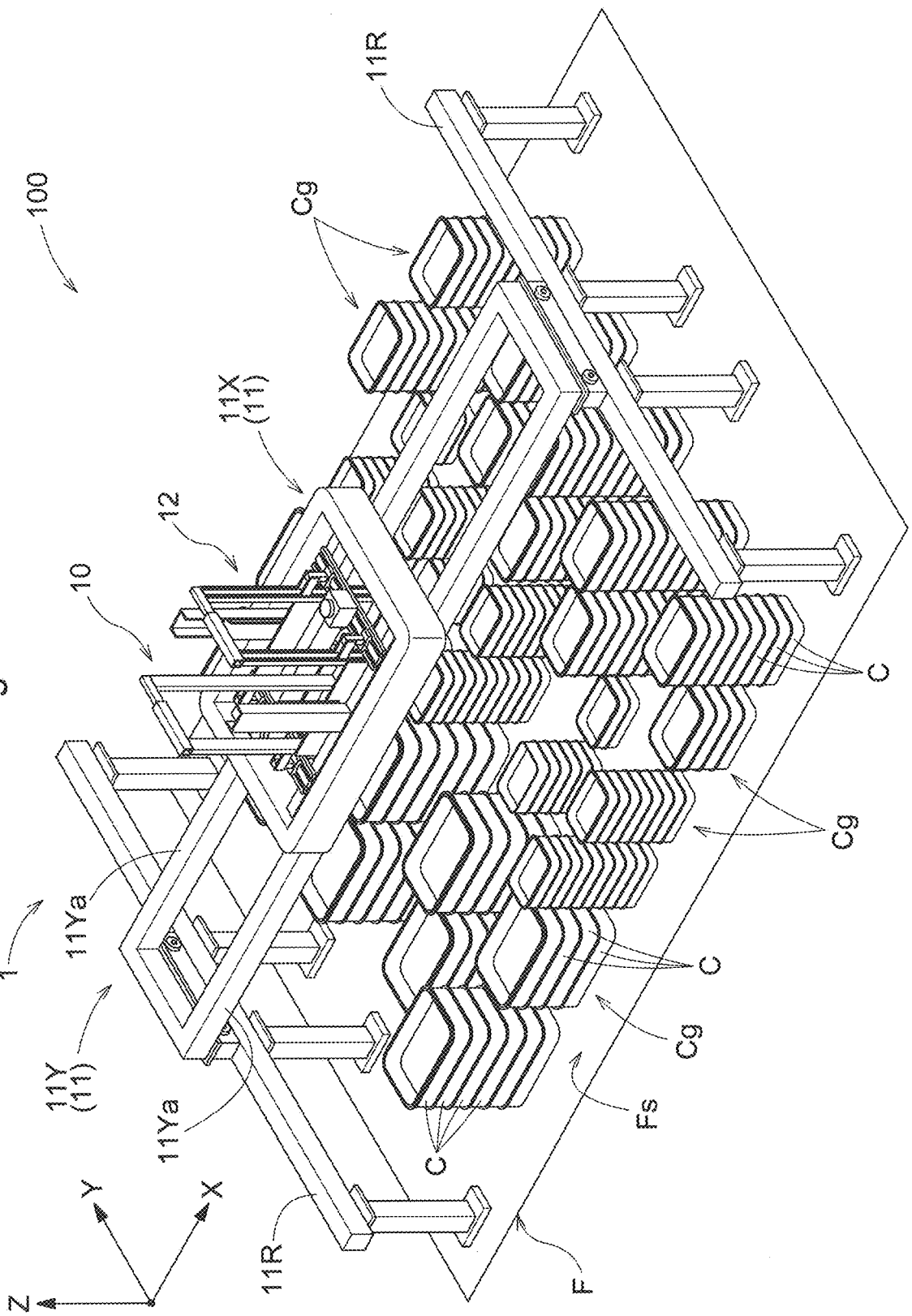
FIG. 1 is a schematic perspective view of an article storage facility.

The following describes an article storage facility according to the present embodiment with reference to the drawings. As shown in FIG. 1, an article storage facility 100 includes a transport device 1 that transports a container C, and a control device 2 (see FIG. 5) that controls the transport device 1. The article storage facility 100 is configured to place and store a container group Cg that includes a plurality of containers C in a stacked state, on a placement surface F that constitutes a storage location. In the article storage facility 100, containers C that house a component or the like, or empty containers C that do not house a component or the like, are stored as articles.

Hereinafter, an ideal surface constituted by the placement surface F is denoted as a reference surface Fs, directions that are parallel with the reference surface Fs and are orthogonal to each other are denoted as an X direction and a Y direction, and a direction that is orthogonal to the reference surface Fs is denoted as a Z direction. The reference surface Fs is an ideal virtual surface that extends along a horizontal plane. Therefore, the X direction and the Y direction that are parallel with the reference surface Fs are directions that are parallel with the horizontal direction, and the Z direction orthogonal to the reference surface Fs is a direction that is parallel with a vertical (top-bottom) direction. Note that the floor of the building where the article storage facility 100 is installed and the surface of a support platform installed on the floor cannot be completely horizontal planes. Therefore, the height (the position in the Z direction) of the actual placement surface F slightly varies depending on the location, unlike the reference surface Fs.

Figure 2:
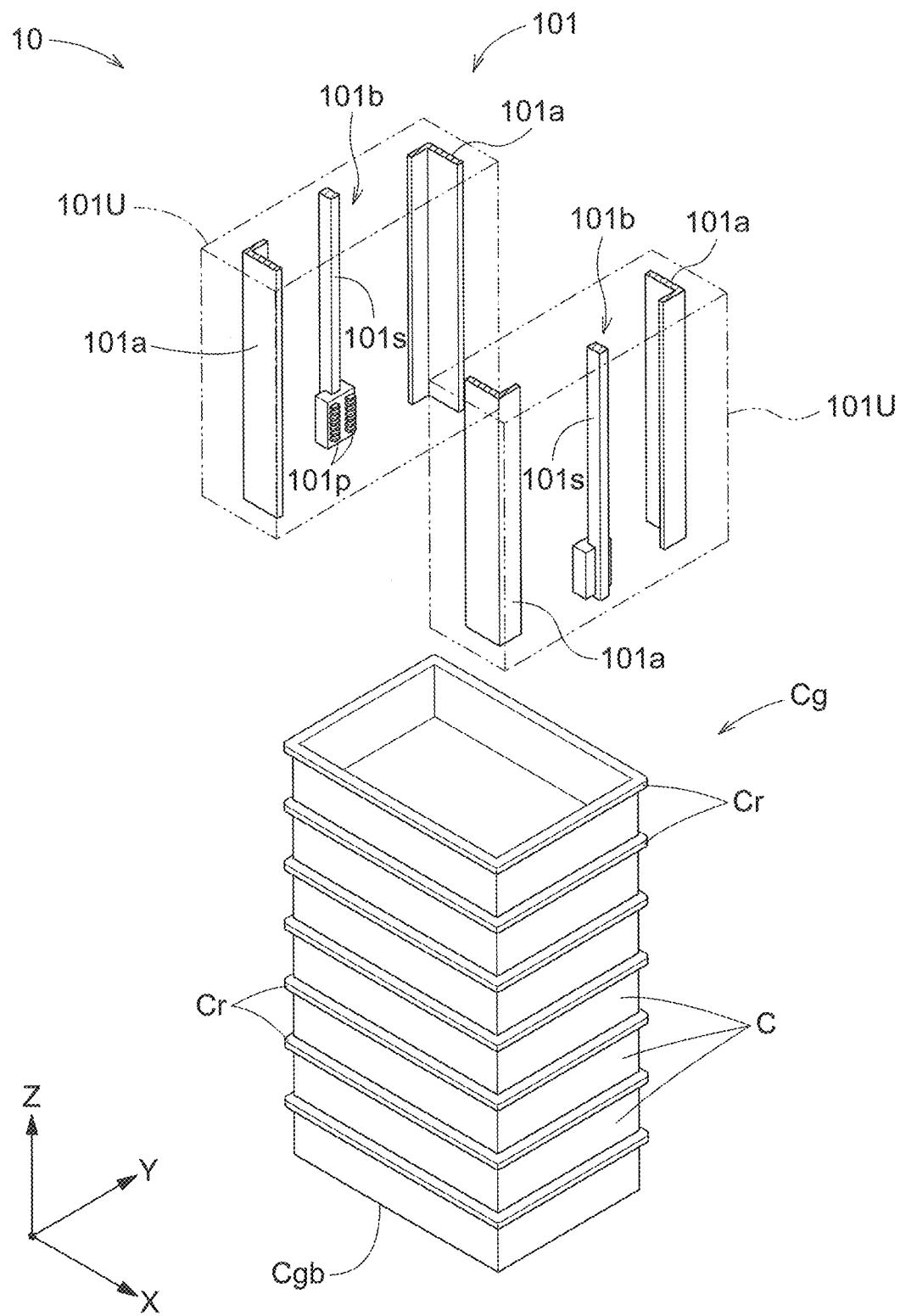
FIG. 2 is a diagram showing operations of a gripping unit.

As shown in FIGS. 1 to 3, the transport device 1 includes a gripping unit 101 that grips a single container C or a plurality of containers C in a stacked state, a movement mechanism 11 that moves the gripping unit 101 in the X and Y directions, and a lifting/lowering mechanism 12 that lifts and lowers the gripping unit 101 in the Z direction.

In the present embodiment, the movement mechanism 11 includes a pair of fixed guide rails 11R that are arranged on the placement surface F in the Y direction at positions that are separated from each other in the X direction, are fixed to the placement surface F, and are fixed to the placement surface F, a Y direction movement body 11Y that is supported by the pair of fixed guide rails 11R and moves the gripping unit 101 in the Y direction, and an X direction movement body 11X that is supported by the Y direction movement body 11Y and moves the gripping unit 101 in the X direction.

In the present embodiment, the Y direction movement body 11Y is constituted by a movable rail that extends in the X direction. In the example shown in the drawing, the movable rail includes a pair of rail portions 11Ya that are arranged in parallel with each other. The two end portions of the Y direction movement body 11Y in the X direction are supported so as to be movable relative to the fixed guide rails 11R, and the Y direction movement body 11Y move in the Y direction along the fixed guide rails 11R. The Y direction movement body 11Y is driven by a Y direction movement driving unit (not shown) constituted by a motor or the like, for example.

In the present embodiment, the X direction movement body 11X is constituted by a carriage that travels on the movable rail that constitutes the Y direction movement body 11Y. The X direction movement body 11X moves in the X direction by travelling along the Y direction movement body 11Y that extends in the X direction. The X direction movement body 11X is driven by a X direction movement driving unit (not shown) constituted by a motor or the like, for example.

The gripping unit 101 is supported by the X direction movement body 11X. Therefore, when the X direction movement body 11X moves in the X direction, the gripping unit 101 supported by the X direction movement body 11X also moves in the X direction. Also, as described above, the X direction movement body 11X is supported by the Y direction movement body 11Y. Therefore, when the Y direction movement body 11Y moves in the Y direction, the gripping unit 101 supported by the X direction movement body 11X also moves in the Y direction. Thus, the gripping unit 101 is configured to be movable in the X and Y directions.

The lifting/lowering mechanism 12 is configured to lift and lower the gripping unit 101 in the Z direction, and is supported by the X direction movement body 11X in this example. Although not shown in the drawing in detail, the lifting/lowering mechanism 12 includes a belt that is coupled to the gripping unit 101 and a lifting/lowering driving unit (not shown) that drives the belt. The lifting/lowering driving unit is constituted by a motor or the like, for example. As a result of the belt being driven by the lifting/lowering driving unit, the gripping unit 101 is lifted and lowered in the Z direction. As described above, in the present embodiment, the gripping unit 101 is supported by the X direction movement body 11X with the lifting/lowering mechanism 12 interposed therebetween.

In the present embodiment, the transport device 1 includes a gripping mechanism 10. The gripping mechanism 10 includes the above-described gripping unit 101 and a grip driving unit (not shown) that drives the gripping unit 101. The grip driving unit is constituted by a motor or the like, for example. The gripping unit 101 is configured to be driven by the grip driving unit, and change the state thereof between a gripping state for gripping a container C and a non-gripping state for not gripping a container C.

As shown in FIGS. 2 and 3, in the present embodiment, the gripping unit 101 includes a pair of gripping units 101U that move closer to or away from each other in the X direction. Each of the pair of gripping units 101U is supported by the X direction movement body 11X with the lifting/lowering mechanism 12 being interposed therebetween, so as to be lifted and lowered in synchronization with each other between the pair of rail portions 11Ya of the Y direction movement body 11Y. Each of the pair of gripping units 101U includes a pair of positioners 101a that are lined up in the Y direction and move closer to or away from each other in the Y direction, and a gripper 101b that is located between the pair of positioners 101a lined up in the Y direction.

In the present embodiment, the positioners 101a are configured to, when the gripping unit 101 is in a gripping state, position a container C by abutting against the outer periphery of the container C from the outside. In this example, the pairs of positioners 101a respectively included in the pair of gripping units 101U, i.e., four positioners 101a in total are configured to come into contact with the four corner points of a container C that has a rectangular shape in a plan view thereof. In the example shown the drawing, the plurality of positioners 101a are each formed as a columnar body whose cross section taken along the horizontal plane has an L shape, so as to match the shape of the respective outer peripheries of the four corner points of the container C.

In the present embodiment, each gripper 101b is configured to grip a grip-target portion Cr that is a flange-shaped portion protruding from the entire outer periphery of an upper end portion of the container C. In this example, as shown in FIG. 4, each gripper 101b includes a plurality of protrusions 101p that engage with the grip-target portion Cr of a container C when the gripping unit 101 is in a gripping state, and a support member 101s that supports the plurality of protrusions 101p.

In the present embodiment, each support member 101s is formed so as to have a columnar shape that extends in the Z direction, and supports a plurality of protrusions 101p in a lower end area thereof. The plurality of protrusions 101p supported by each support member 101s are lined up in the Z direction in the lower end area of the support member 101s, and protrude toward the other support member 101s that is located so as to face the support member 101s in the X direction (protrude inward). In this example, a plurality of protrusions 101p lined up in the Z direction are arranged in a plurality of rows (two rows in the example shown in FIG. 2) in the Y direction.

Each of the plurality of protrusions 101p is biased by a spring in a direction in which the protrusion protrudes inward (toward the other support member 101s). Therefore, as shown in FIG. 4, when the gripping unit 101 is in a gripping state, some of the plurality of protrusions 101p retract outward against the force of the spring due to the reacting force from the grip-target portion Cr of the container C, and other protrusions 101p that are located downward of the protrusions 101p that have retracted come into a state in which the protrusions 101p support the grip-target portion Cr of the container C from below. Also, in such a state, the positioners 101a come into contact with the outer periphery of the container C from the outside, or come closer to the outside, and position the container C in the X and Y directions (see FIG. 3).

Figure 4:
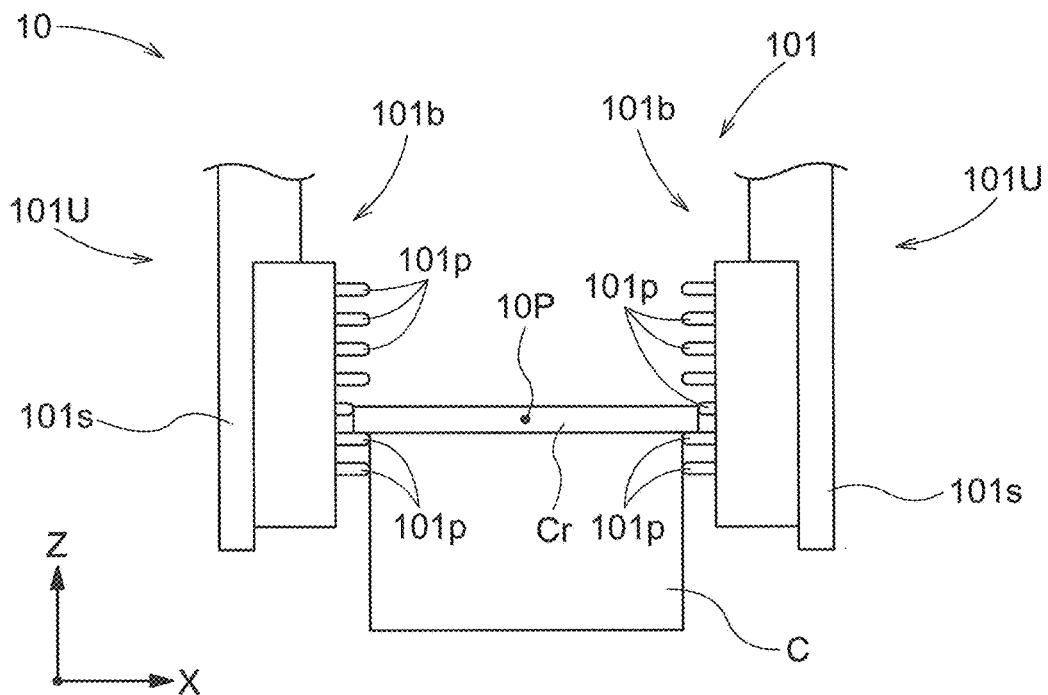
FIG. 4 is a diagram showing a gripping state in which the gripping unit grips a container.

A point that is to be used as a reference when the gripping unit 101 grips the container C is defined as a gripping reference point 10P (see FIG. 4). The gripping reference point 10P is a central position of the area surrounded by the gripping unit 101, in the X and Y directions, and a position corresponding to the reference position of the gripping unit 101 in the Z direction. In the present embodiment, the intermediate position between the pair of grippers 101b that face each other in the X direction is the central position of the area surrounded by the gripping unit 101, in the X direction. In each of the gripping units 101U, the intermediate position between the pair of positioners 101a lined up in the Y direction is the central position of the area surrounded by the gripping unit 101, in the Y direction. Also, in the intermediate position, in the Z direction, of the area in which the plurality of protrusions 101p are arranged in each of the pair of gripping units 101 is the reference position of the gripping unit 101 in the Z direction. Here, the gripping reference point 10P is determined based on the positions in the X, Y, and Z directions thus determined. The transport device 1 is configured to transport one or more containers C in a state where the transport device 1 grips one container C that is to be gripped, as shown in FIG. 3, by adjusting the position of the gripping reference point 10P of the gripping unit 101 in the X, Y, and Z directions so as to match the position of each of the containers C in the tiers included in the container group Cg, in the X, Y, and Z directions.

FIGS. 2 and 3 show an example in which the transport device 1 takes out the top three containers C from the container group Cg that includes seven containers C. The transport device 1 can separate one or more containers C from the container group Cg and transport them. Also, the transport device 1 can place and stack other one or more containers C that have been transported, on top of the container group Cg.

Here, the containers C that are the targets to be transported by the transport device 1 and the targets to be placed on the placement surface F can be stacked in a plurality of tiers so as to be in a stacked state. As described above, in the present embodiment, each container C is formed so as to have a rectangular shape in a plan view thereof. However, the container C is not limited in this way, and may be formed so as to have a shape other than a rectangular shape, such as a polygonal shape, a circular shape, or an elliptical shape in a plan view thereof. Also, in the present embodiment, as shown in FIG. 1, a plurality of types of containers C that vary from each other in at least one of: the dimensions of the bottom surface; and the height can be stored on the placement surface F. In this example, as shown in FIG. 1, the container group Cg that includes a plurality of containers C in a stacked state is constituted by the same type of containers C that are the same in the dimensions of the bottom surface and the height. However, the container group Cg may include a plurality of types of containers C that are different from each other if the containers C can be stacked. Such containers C are, for example, plastic containers that are used in a manufacturing line of a factory to house a component or the like. Also, for example, the transport device 1 functions as a receiving/dispatching device for receiving and dispatching a container C that houses a component or the like or an empty container C that does not house a component or the like, from and to the outside of the article storage facility 100. In the article storage facility 100, containers C that house such a component or the like, or empty containers C that do not house a component or the like, are stored as articles.

Figure 5:
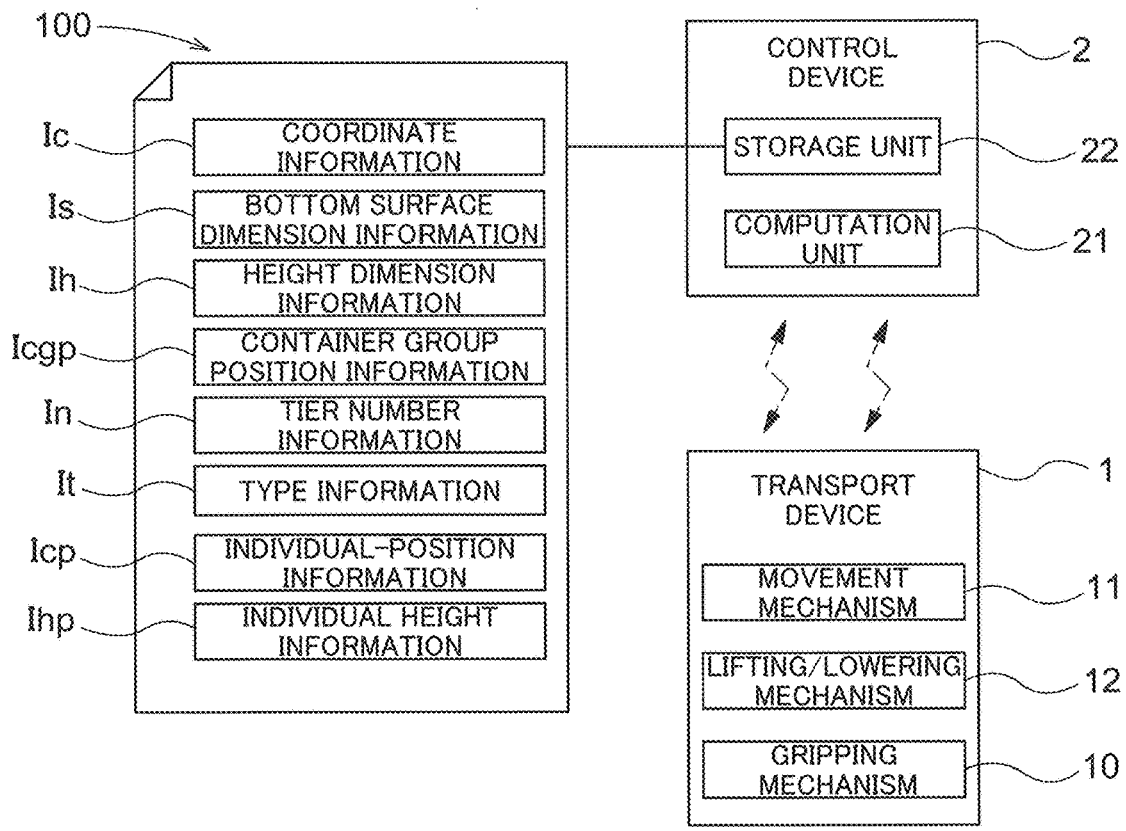
FIG. 5 is a control block diagram for the article storage facility.

As shown in FIG. 5, the control device 2 can communicate with the transport device 1, and is configured to be able to control the transport device 1. Also, the control device 2 controls and manages the article storage facility 100 overall. In the present embodiment, the control device 2 manages the position of the container group Cg placed on the placement surface F, the types of the containers C included in the container group Cg, and the number of containers C (the number of tiers) included in the container group Cg. Note that, in the present embodiment, even when a single container C is placed on the placement surface F, the control device 2 manages the container C as a container group Cg of which the number of containers C included in the container group Cg (the number of tiers) is "1". The control device 2 includes a processor such as a microcomputer and peripheral circuits such as a memory, for example. Each function is realized by these pieces of hardware and programs that are executed on a processor of a computer or the like cooperating with each other.

The control device 2 includes a computation unit 21 and a storage unit 22. The storage unit 22 stores coordinate information Ic that indicates actual positions of a plurality of points on the placement surface F in the X, Y, and Z directions, bottom surface dimension information Is that indicates the dimensions of the bottom surface of the container C in the X and Y directions, height dimension information Ih that indicates the height Ch (see FIG. 13) of the container C in the Z direction, container group position information Icgp that indicates the position of the container group Cg on the placement surface F in the X and Y directions (container group position Cgp), and tier number information In that indicates the number of tiers that is the number of containers C included in the container group Cg. In the present embodiment, the container group position Cgp indicated by the container group position information Icgp is the position of a container group bottom surface Cgb of the bottom surface of the container C in the bottom tier of the container group Cg, in the X and Y directions on the placement surface F. Here, the position corresponding to the position of the center of gravity of the container group bottom surface Cgb on the placement surface F (the position of the center of gravity of the figure) is defined as the container group position Cgp. Also, in the present embodiment, the container group Cg is placed on the placement surface F so that at least one of the sides of the containers C that have a rectangular shape in a plan view thereof is parallel with the X direction. Therefore, the container group position information Icgp does not include information regarding the angle relative to the X and Y directions. Note that, if the containers C are arranged such that any of the sides thereof is inclined relative to the X direction, it is preferable that container group position information Icgp includes information regarding the angle relative to the X and Y directions. The computation unit 21 is configured to execute the inclination computation processing and the individual position computation processing described below, based on these pieces of information. Note that the height Ch of each container C in the Z direction refers to the height Ch in the state where the container C is placed on the reference surface Fs, and it may also be referred to as a height dimension Ch of the container C.

Figure 6:
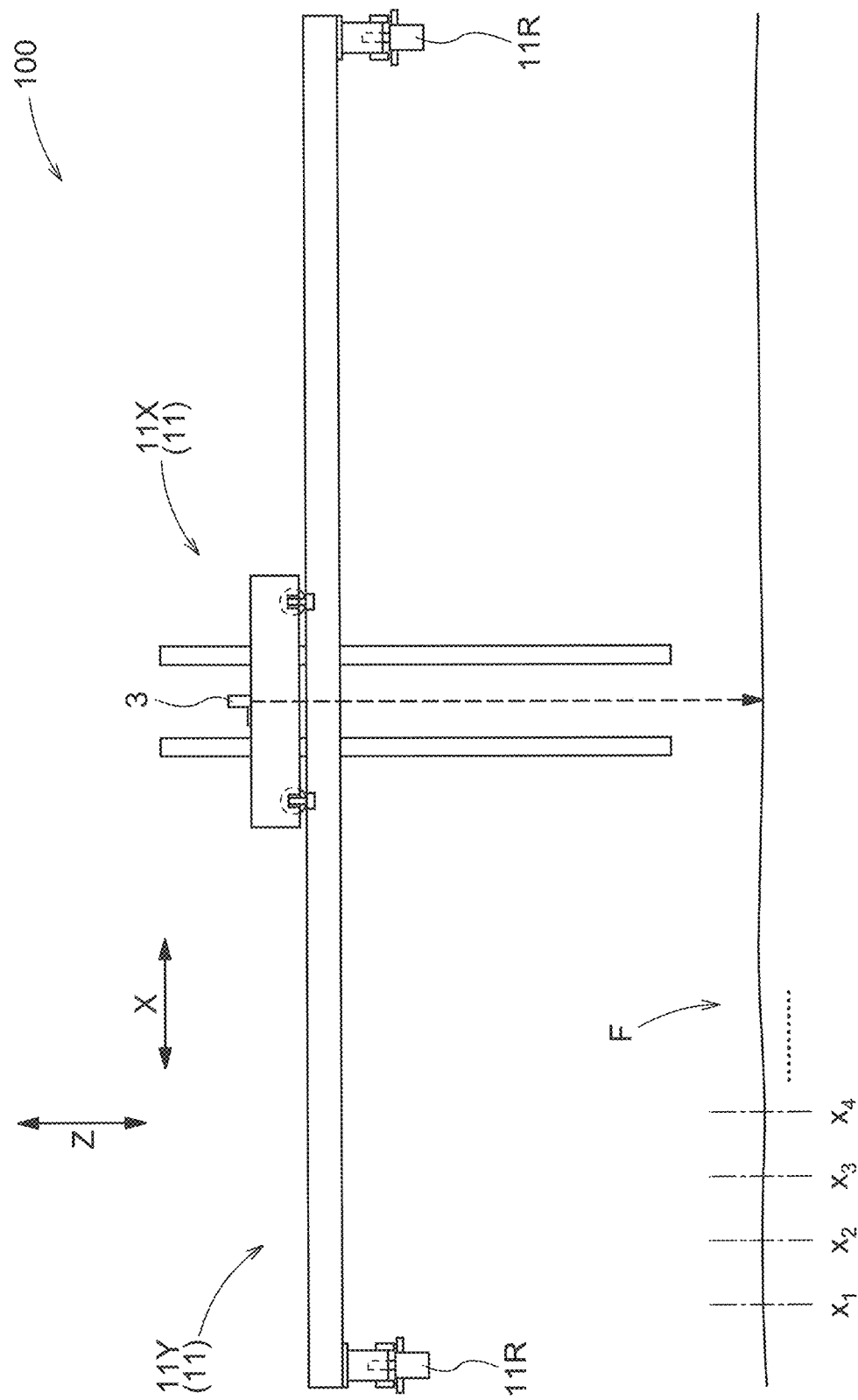
FIG. 6 is a diagram showing how to measure the height at each position on a placement surface in an X direction.
Figure 7:
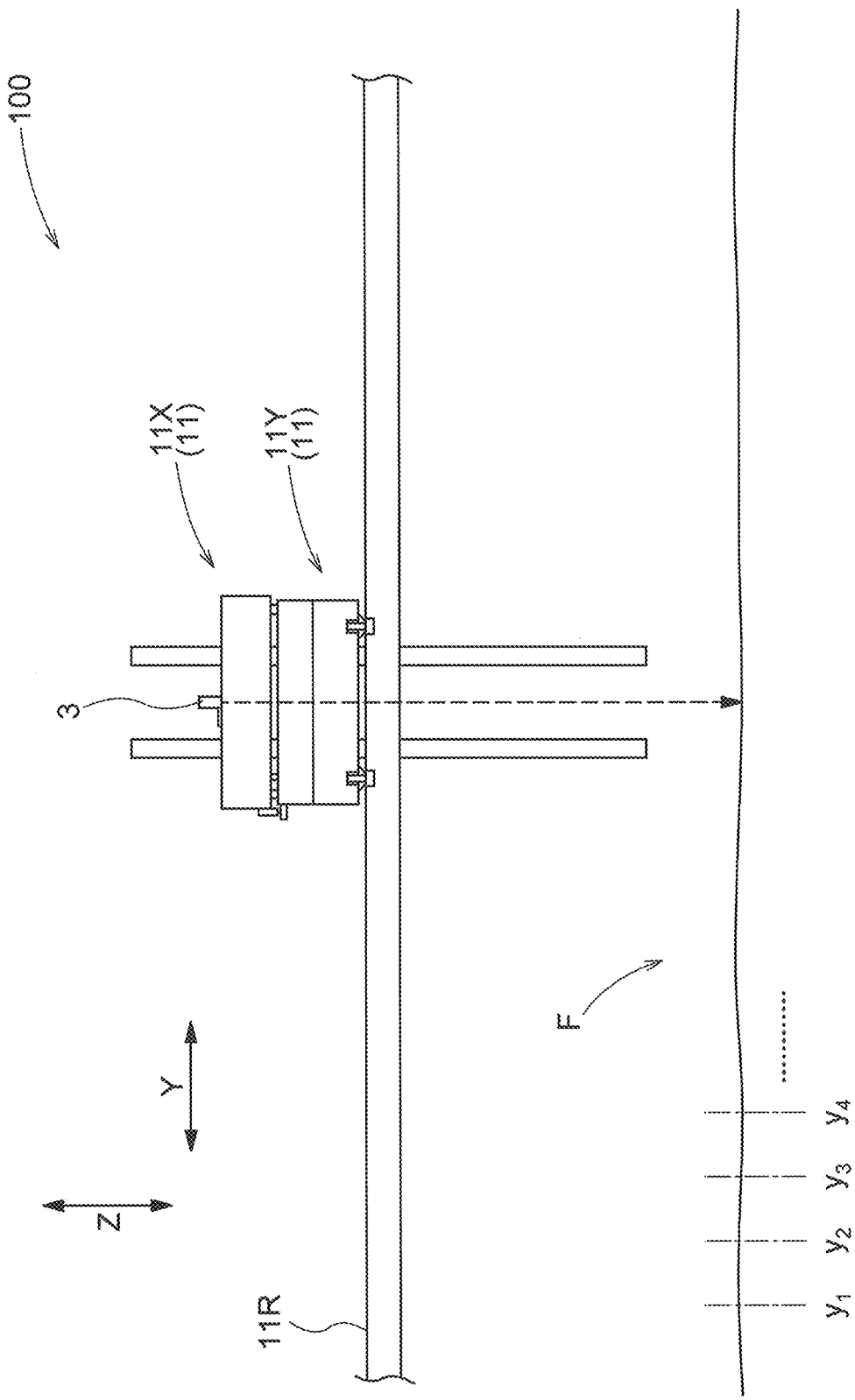
FIG. 7 is a diagram showing how to measure the height at each position on the placement surface in a Y direction.

In the present embodiment, measurement is performed to measure the actual positions of points (a plurality of points) on the placement surface F in the Z direction in advance, and stores the measurement values measured through the measurement, in the storage unit 22 as coordinate information Ic. In this measurement, as shown in FIGS. 6 and 7, a measurement device 3 that measures the vertical distance to the placement surface F is temporarily attached to the X direction movement body 11X. As described above, the X direction movement body 11X can move in the X direction by itself, and can also move in the Y direction as a result of the Y direction movement body 11Y moving. The measurement device 3 attached to such an X direction movement body 11X measures the vertical distance from each point on the placement surface F to the placement surface F. Through such measurement of the distance in a vertical direction, the actual position (height) in the Z direction of each point on the placement surface F in the X and Y directions is measured, and coordinate information Ic that indicates the actual position of each point on the placement surface F in the X, Y, and Z directions is acquired. Note that a distance sensor that utilizes laser light or ultrasonic waves, or another well-known measurement device may be used as the measurement device 3.

Figure 8:
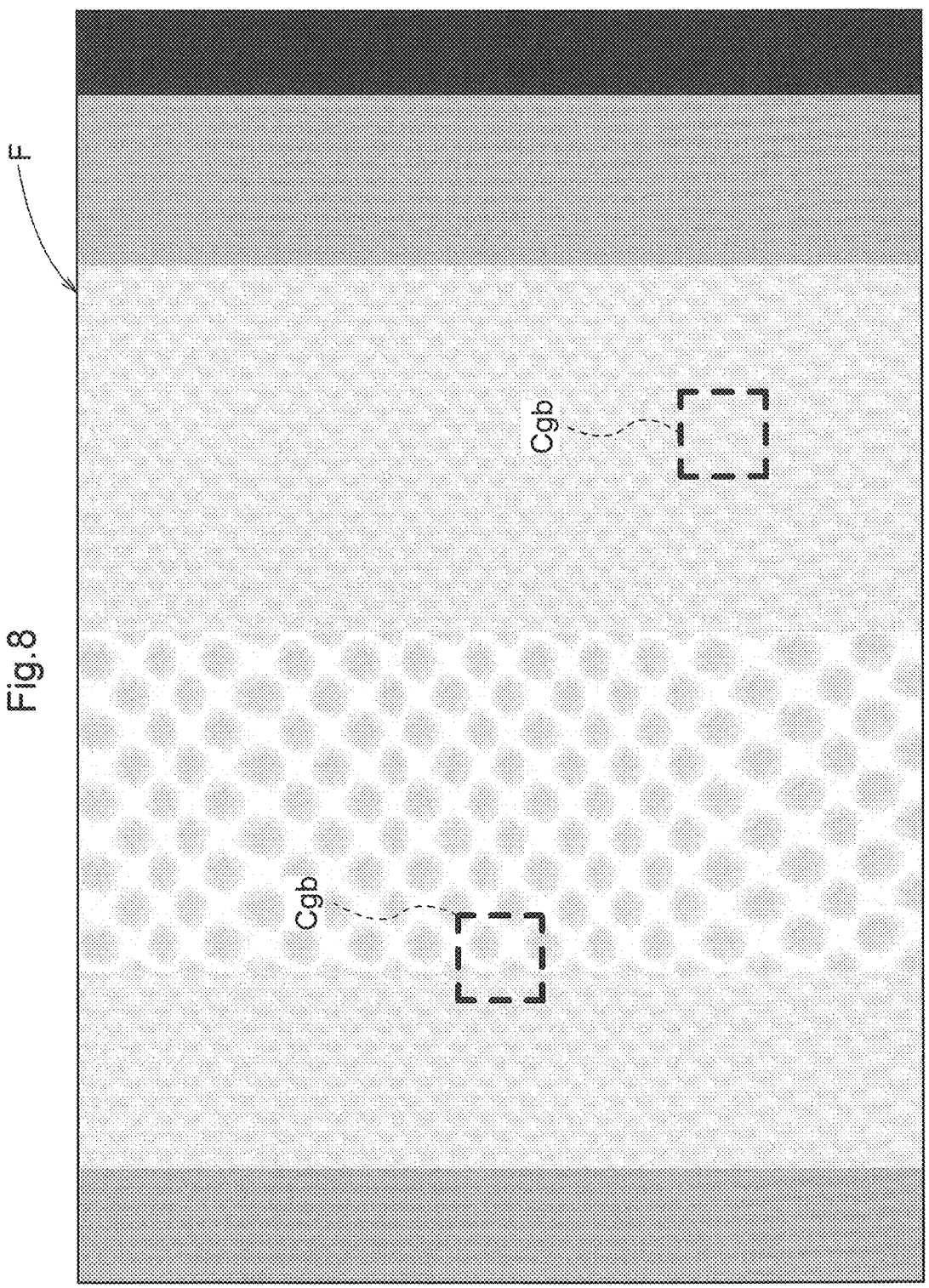
FIG. 8 is a diagram schematically showing the inclination of the placement surface.

FIG. 8 is an image of the height at each point on the placement surface F. In the drawing, an area with a darker color shows a higher position, and an area with a lighter color shows a lower position. In this way, the height (the position in the Z direction) of the actual placement surface F slightly varies depending on the location, unlike the reference surface Fs that is an ideal surface. Each rectangle of a dashed line in the drawing indicates the bottom surface of a container C placed on the placement surface F, and more specifically a container group bottom surface Cgb that is the bottom surface of the container C included in the bottom tier of a container group Cg. One of the two container group bottom surfaces Cgb shown in FIG. 8 is placed on an area (plane) that is at the same height in the placement surface F, and in this case, the container group Cg is in the state of being placed on the placement surface F in an appropriate attitude (not inclined) (see FIG. 10). Also, the other of the two container group bottom surfaces Cgb shown in FIG. 8 is placed so as span areas that are at different heights in the placement surface F, and in this case, the container group Cg is in the state of being placed on the placement surface F in an inclined attitude (see FIG. 11).

Figure 9:
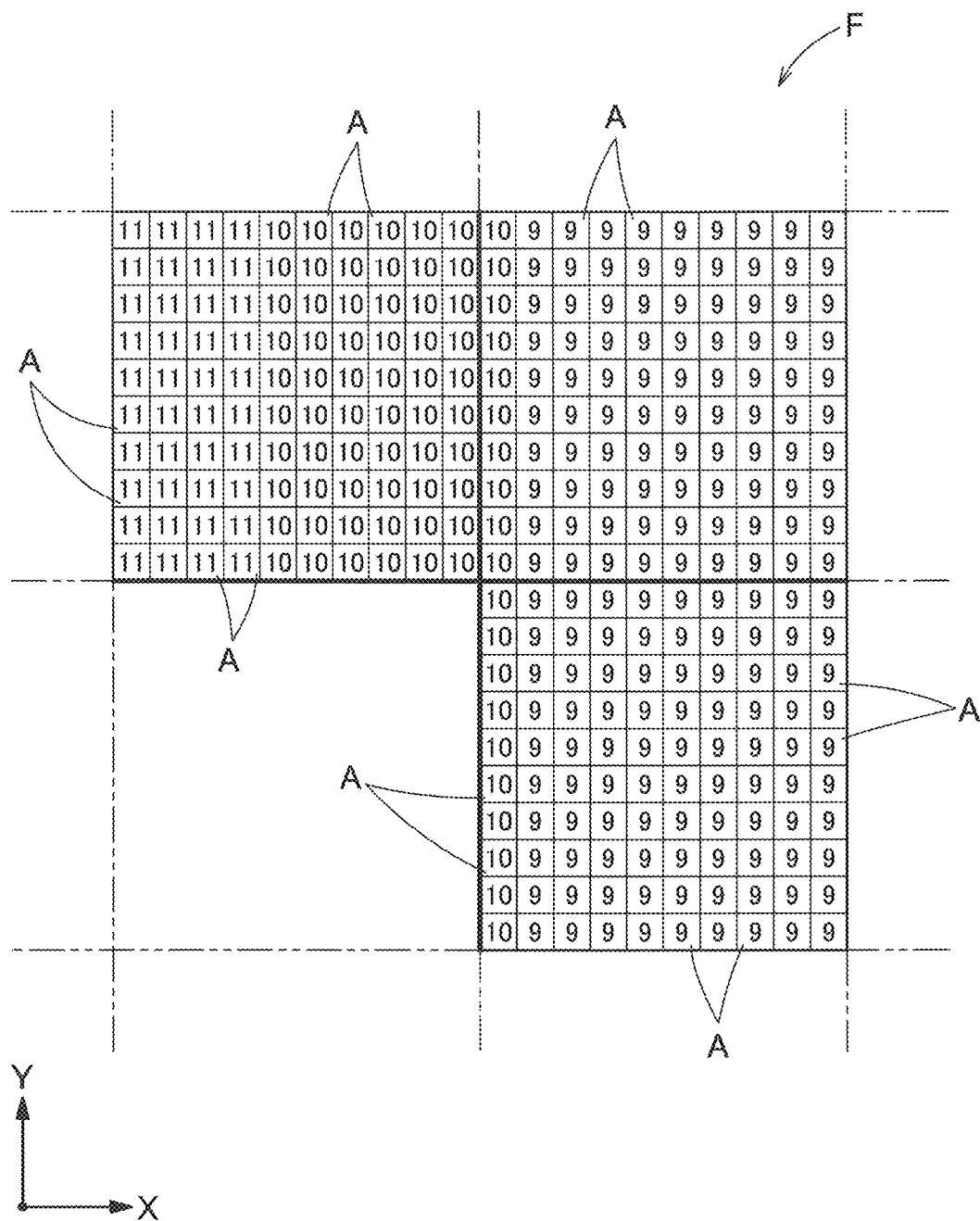
FIG. 9 is a diagram showing the results of measurement of the height at each position on the placement surface.

FIG. 9 shows the results of the measurement performed at each point in a portion of the placement surface F. In FIG. 9, the numerical value shown in each small frame indicates the height of the point corresponding thereto in the placement surface F when the height of the reference surface Fs is defined to be "0", in millimeters, for example. In the present embodiment, the placement surface F is divided into a plurality of unit lots A, and the position in the Z direction is measured for each of the plurality of unit lots A. The position in the X direction, the position in the Y direction, and the position in the Z direction of each of the plurality of unit lots A are stored in the above-described storage unit 22 as coordinate information Ic.

Figure 10:
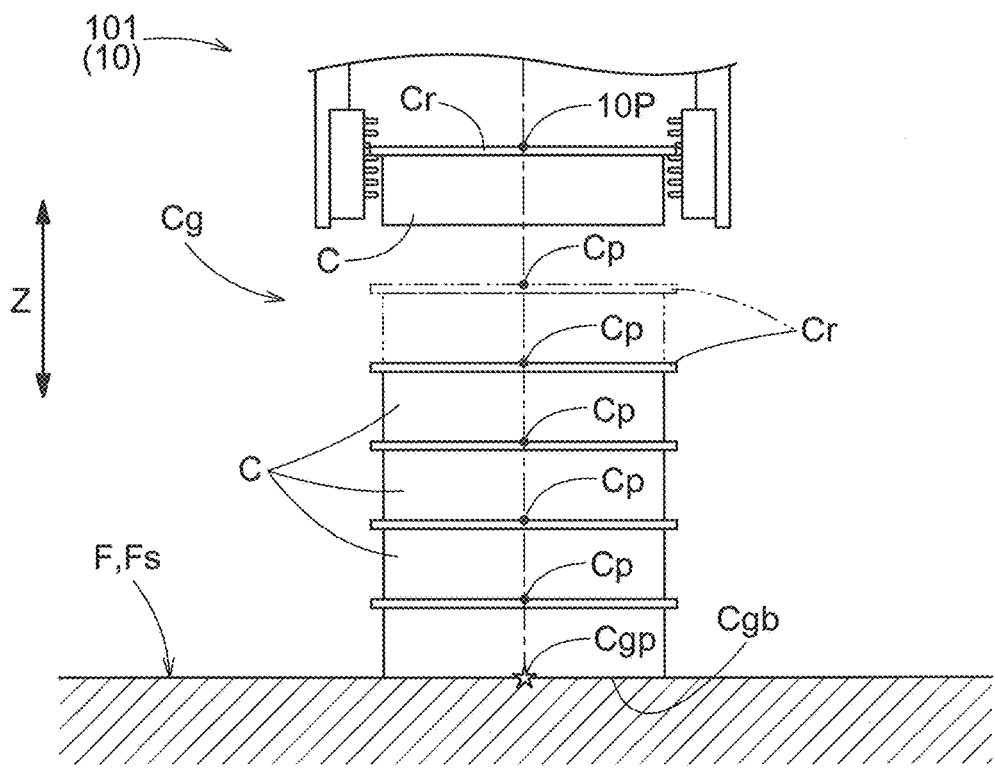
FIG. 10 is diagram showing a relationship between the individual positions of the containers and the gripping reference point of the gripping unit when a container group is not inclined.

As shown in FIG. 10, when a container C is further stacked on the container group Cg, if the container group Cg is in the state of being placed on the placement surface F in an appropriate attitude, i.e., in a non-inclined attitude, the movement mechanism 11 adjusts the position of the gripping reference point 10P of the gripping unit 101 in the X and Y directions so as to match the container group position Cgp that is the position of the container group Cg on the placement surface F in the X and Y directions. Here, the gripping reference point 10P of the gripping unit 101 coincides with the position of the center of gravity of the shape of the outer periphery (the position of the center of gravity of the figure) of the grip-target portion Cr of the container C gripped by the gripping unit 101. Note that, in the present embodiment, an individual position Cp that is the position, in the X and Y directions, of each of the containers C included in the container group Cg is the position of the center of gravity of the shape of the outer periphery (the position of the center of gravity of the figure) of the grip-target portion Cr of the container C. Also, as described above, in the present embodiment, the position on the placement surface F, corresponding to the position of the center of gravity of the container group bottom surface Cgb, is the container group position Cgp. As shown in FIG. 10, the individual position Cp that is the position, in the X and Y directions, of each of the containers C in the tiers included in the container group Cg, and the container group position Cgp, are the same position in the X and Y directions in a state where the container group Cg is placed on the placement surface F in an appropriate attitude. Upon the movement mechanism 11 completing positioning in the X and Y directions, the lifting/lowering mechanism 12 lowers the gripping unit 101 according to the height of the container C in the uppermost tier included in the container group Cg. More specifically, assuming that another container C (indicated by a virtual line in the drawing) is stacked on the container C in the uppermost tier included in the container group Cg, the lifting/lowering mechanism 12 lowers the gripping unit 101 so that the gripping reference point 10P of the gripping unit 101 coincides with the individual position Cp of such a container C. Note that, when gripping and transporting some of the containers C included in the container group Cg, the lifting/lowering mechanism 12 lowers the gripping unit 101 according to the height of the container C specified as the target to be gripped, of the containers C in the tiers included in the container group Cg. In such case, the lifting/lowering mechanism 12 lowers the gripping unit 101 so that the gripping reference point 10P of the gripping unit 101 coincides with the individual position Cp of the container C that is the target to be gripped.

Figure 11:
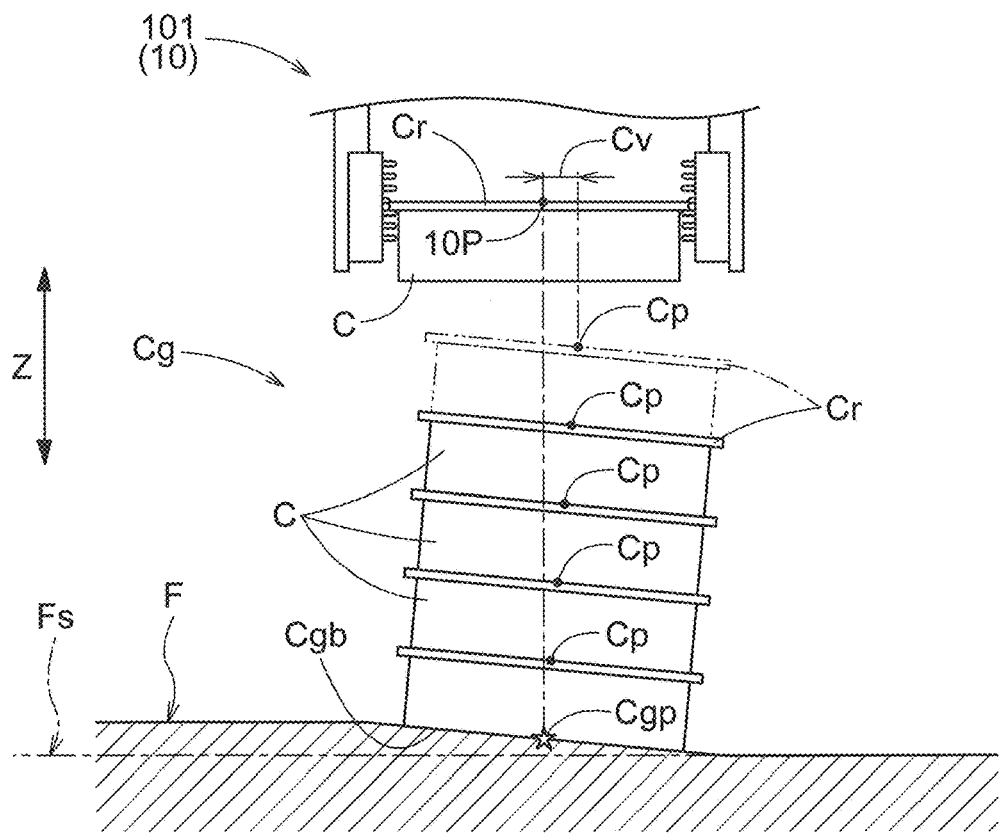
FIG. 11 is diagram showing a relationship between the individual positions of the containers and the gripping reference point of the gripping unit when a container group is inclined.

In this way, in a state where the container group Cg is placed on the placement surface F in an appropriate attitude, it is possible to adjust the position of the gripping unit 101 in the X and Y directions so as to match the position of each of the containers C in the tiers included in the container group Cg by adjusting the position of the gripping reference point 10P in the X and Y directions so as to match the container group position Cgp indicated by the container group position information Icgp, using the movement mechanism 11. However, as shown in FIG. 11, in a state where the container group Cg is placed on the placement surface F in an inclined attitude, the individual position Cp of each of the containers C in the tiers included in the container group Cg will be displaced from the container group position Cgp indicated by the container group position information Icgp in at least one of the X and Y directions. In particular, the displacement between the individual position Cp of the container C and the container group position Cgp in the X and Y directions increases in an upward direction from the container group Cg. Therefore, when the container group Cg is placed in an inclined attitude, even if the position of the gripping reference point 10P is adjusted to the container group position Cgp in the X and Y directions by the movement mechanism 11, a displacement in the X and Y directions occurs between the individual position Cp of each of the containers C in the tiers included in the container group Cg and the gripping reference point 10P. In such a case, it is difficult to place another container C on top of the container C in the uppermost tier of the container group Cg, and it is difficult to appropriately grip each of the containers C using the gripping unit 101 when transporting some containers included in the container group Cg.

Figure 12:
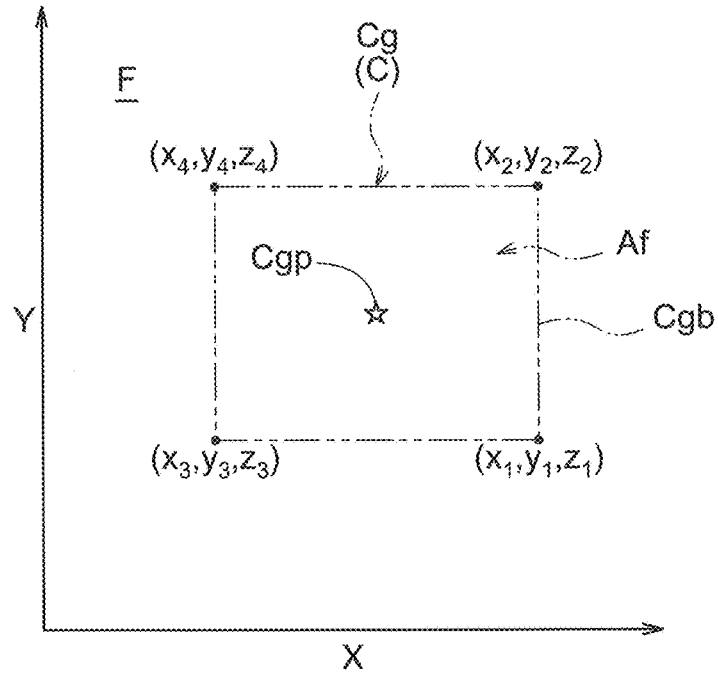
FIG. 12 is a diagram showing coordinate information regarding a plurality of points in a container group bottom surface area.
Figure 13:
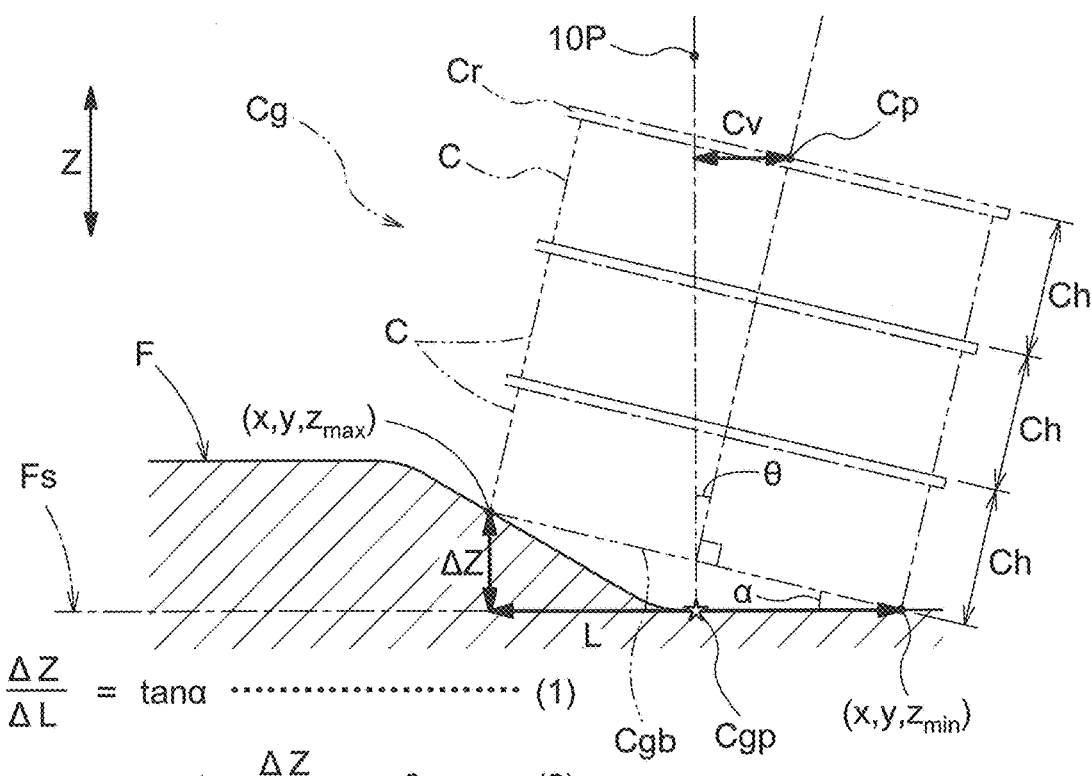
FIG. 13 is an illustration showing an example in which a correction value is computed.

Therefore, the control device 2 performs correction value computation processing to compute, as a correction value Cv, a displacement in the X and Y directions between the individual position Cp of each of the containers C in the tiers included in the container group Cg and the container group position Cgp indicated by the container group position information Icgp. As this correction value computation processing, as shown in FIGS. 12 and 13, the control device 2 performs inclination computation processing to obtain a placement inclination θ of the container group Cg placed on the placement surface F relative to the Z direction, based on the coordinate information Ic, the bottom surface dimension information Is, and the container group position information Icgp stored in the storage unit 22, and performs individual position computation processing to obtain individual-position information that indicates the position (the individual position Cp), in the X and Y directions, of each of the containers C in the tiers included in the container group Cg, based on the container group position information Icgp, the placement inclination, and the height dimension information Ih. Thereafter, the control device 2 controls the movement mechanism 11 based on the individual-position information obtained through individual position computation processing. In other words, the control device 2 uses, as the correction value Cv, a relative distance (a displacement) in the X and Y directions between the individual position Cp that is the position of each of the containers C in the tiers included in the container group Cg in the X and Y directions and the container group position Cgp indicated by the container group position information Icgp, and controls the movement mechanism 11 according to such a correction value Cv and the container group position Cgp indicated by the container group position information Icgp.

The following describes inclination computation processing that is performed to obtain the placement inclination θ, and individual position computation processing that is performed to obtain the individual position Cp of a container C, with reference to FIGS. 12 and 13. Note that, in FIGS. 11, 13, and so on, the placement inclination is emphasized so as to look greater than the actual inclination.

As shown in FIG. 12, in inclination computation processing, the control device 2 obtains a container group bottom surface area Af that is the area in the placement surface F occupied in the X and Y directions by the container group bottom surface Cgb that is the bottom surface of the container C in the lowermost tier of the container group Cg, based on the container group position information Icgp and the bottom surface dimension information Is, and obtains the positions of a plurality of points on the container group bottom surface Cgb in the Z direction, based on the coordinate information Ic regarding a plurality of points corresponding to the container group bottom surface area Af in the placement surface F. Thereafter, the control device 2 obtains a bottom surface inclination α that is the inclination of the container group bottom surface Cgb, based on the positions of the plurality of points on the container group bottom surface Cgb in the Z direction, and obtains the placement inclination θ based on this bottom surface inclination α.

As described above, the storage unit 22 stores container group position information Icgp that indicates the container group position Cgp, and bottom surface dimension information Is that indicates the bottom surface dimensions of each container C. The control device 2 uses these pieces of information to obtain coordinates of a plurality of points corresponding to the container group bottom surface area Af, for example, the coordinates of points respectively corresponding to the four corner points of the container group bottom surface Cgb that is rectangular (see FIG. 12). As described above, in the present embodiment, the container group Cg is placed on the placement surface F such that at least one of the sides of the containers C that have a rectangular shape in a plan view thereof is parallel with the X direction. Also, the container group position Cgp is set to be the position of the center of gravity of the container group bottom surface Cgb. Therefore, it is possible to obtain the coordinates of the four corner points of the container group bottom surface Cgb based on the container group position Cgp and the bottom surface dimension information Is. Note that this is a non-limiting example, and the coordinates of three or more points included in the container group bottom surface area Af may be obtained. If it is possible to obtain the coordinates of three or more points included in the container group bottom surface area Af, it is possible to obtain the bottom surface inclination α that is the inclination of the container group bottom surface Cgb.

For example, as shown in FIG. 13, the placement inclination θ that is the inclination of the container group Cg relative to the Z direction is equal to the bottom surface inclination α that is the inclination of the container group bottom surface Cgb relative to the reference surface Fs. The bottom surface inclination α can be obtained based on the coordinates of three or more points included in the container group bottom surface area Af described above, specifically the coordinates of the four corner points of the container group bottom surface Cgb in this example. This is because the attitude of a plane in three-dimensional space is determined by the coordinates of three points that are included in the plane. For the sake of simplification of illustration, FIG. 13 illustrates a situation where only an inclination in two-dimensional space is considered. In the example shown in the drawing, the bottom surface inclination α is obtained according to the formulas (1) and (2) below, based on a height difference ΔZ in the Z direction and a relative distance ΔL in a direction that extends along the X-Y plane, between the highest contact point and the lowest contact point of a plurality of contact points at which the bottom surface of the container C is in contact with the placement surface F.

$$\Delta Z/\Delta L = \tan \alpha \tag{1}$$

$$\alpha = \arctan \Delta Z/\Delta L = \theta \tag{2}$$

Here, the bottom surface inclination α and the placement inclination θ have the same value. In this way, in the present embodiment, in inclination computation processing, the bottom surface inclination α that is the inclination of the container group bottom surface Cgb is obtained based on the positions of the plurality of points on the container group bottom surface Cgb in the Z direction, and the placement inclination θ is obtained based on this bottom surface inclination α. Note that, in reality, in inclination computation processing, the computation unit 21 obtains the bottom surface inclination α in X-Y-Z three-dimensional space based on the coordinates of three or more points included in the container group bottom surface area Af, and obtains the placement inclination θ based on the bottom surface inclination α.

In individual position computation processing, the individual position Cp of each of the containers C in the tiers included in the container group Cg is computed based on the placement inclination θ obtained as described above, the container group position information Icgp indicating the container group position Cgp, and the height dimension information Ih indicating the height dimension Ch of the container C. As described above, the storage unit 22 stores the height dimension information Ih indicating the height dimension Ch of each container C, and the tier number information In indicating a stacked tier number n that is the number of containers C included in the container group Cg. Based on these pieces of information, the control device 2 can acquire information regarding the distance from the container group bottom surface Cgb to the upper end portion of the container C in each tier in a direction orthogonal to the container group bottom surface Cgb. As described above, the grip-target portion Cr to be gripped by the gripping unit 101 is formed on the upper end portion of the containers C. Therefore, in the present embodiment, the position of the grip-target portion Cr of each of the containers C in the tiers in the X and Y directions is defined as the individual position Cp of the container C. As described above, in the present embodiment, the position of the center of gravity of the outer periphery of the grip-target portion Cr (the position of the center of gravity of the figure) is defined as the individual position Cp.

The displacement between the individual position Cp indicating the position of the grip-target portion Cr and the container group position Cgp indicated by the container group position information Icgp in the X and Y directions serves as the correction value Cv to be used to correct the gripping reference point 10P relative to the container group position Cgp indicated by the container group position information Icgp, in the X and Y directions. This correction value Cv can be obtained using the formula (3) below.

$$Cv = m \cdot Ch / \sin \theta \quad (3)$$

"Ch" indicates the height dimension of the containers C. "m" indicates the tier number (the mth tier from the bottom) in which the container C to be gripped by the gripping unit 101, and is a natural number no greater than the stacked tier number n of the containers C included in the container group Cg. FIG. 13 shows an example of computing the individual position Cp of the container C in the third tier from the bottom in the container group Cg that includes three tiers of containers C. As described above, the placement inclination θ is obtained as an inclination in three-dimensional space. However, for the sake of simplification of illustration, this example illustrates a situation in which only an inclination in two-dimensional space that is a X-Z plane or a Y-Z plane is considered. In the case, the correction value Cv is a value with respect to the X direction or the Y direction. Even when the placement inclination θ is an inclination in the X-Y-Z three-dimensional space, the correction value Cv with respect to the X direction and the Y direction can similarly be obtained by separating the inclination into an inclination in the X-Z plane and an inclination in the Y-Z plane.

Figure 14:
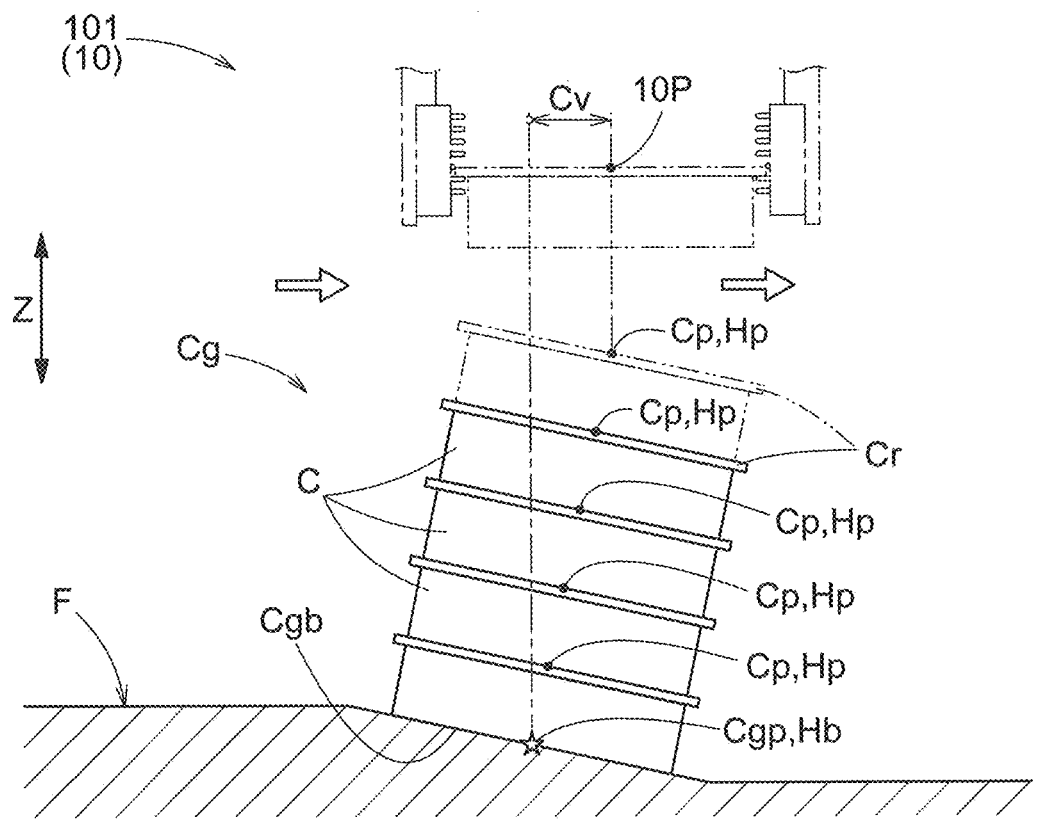
FIG. 14 is a diagram showing operations of the gripping unit when the gripping reference position is corrected according to the correction value.

The individual position Cp of each of the containers C in the tiers included in the container group Cg can be obtained based on the correction value Cv thus obtained and the container group position Cgp indicated by the container group position information Icgp. Specifically, the position of the container group bottom surface Cgb indicated by the container group position Cgp in the X and Y directions, corrected using the correction value Cv in the X and Y directions corresponding to the tier number m of each of the containers C in the tiers, is the individual position Cp of the container C in the tier. Upon the individual position Cp being obtained in this way, the control device 2 controls the movement mechanism 11 based on the individual position Cp as shown in FIG. 14. That is to say, the control device 2 controls the movement mechanism 11 to adjust the position of the gripping reference point 10P of the gripping unit 101 in the X and Y directions so that, when another container C is stacked on the uppermost tier of the target container group Cg, the position matches the individual position Cp of the container C in the additional tier (indicated by a virtual line in the drawing). FIG. 14 shows a situation in which another container C is stacked on the container group Cg that includes four tiers of containers C. In this case, the control device 2 moves the gripping unit 101 in the X and Y directions to the individual position Cp of the container C in the fifth tier that is the additional tier stacked on the container C in the fourth tier from the bottom, which is the uppermost tier. By controlling the movement mechanism 11 in this way, it is possible to appropriately stack another container C on the existing container group Cg.

Also, the control device 2, while obtaining the individual position Cp of each of the containers C in the tiers as described above, obtains individual height information indicating the position of each of the containers C in the tiers included in the container group Cg in the Z direction, based on the coordinate information Ic, the height dimension information Ih, and the container group position information Icgp stored in the storage unit 22. In the present embodiment, the control device 2 recognizes the position in the Z direction indicated by the coordinate information Ic (position in the X, Y, and Z directions) regarding the placement surface F, corresponding to the position of the container group position Cgp in the X and Y directions, as a height Hb of the container group bottom surface Cgb of the container group Cg. The control device 2 adds the height dimension Ch (see FIG. 13) corresponding to the tier number of the container C to the height Hb of the container group bottom surface Cgb to obtain individual height information that indicates an individual height Hp of each of the containers C in the tiers included in the container group Cg.

The control device 2 controls the movement mechanism 11 to adjust the position of the gripping reference point 10P of the gripping unit 101 in the X and Y directions so as to match the individual position Cp of the container C in the additional tier assumed to be stacked on the container C in the uppermost tier of the target container group Cg. Thereafter, the control device 2 instructs the lifting/lowering mechanism 12 to perform a lowering operation to lower the gripping unit 101 to the height that matches the individual height Hp of the container C in the additional tier. Thus, the gripping unit 101 is moved to the position that is indicated by the individual position Cp, in the X and Y directions, and is the position in the Z direction indicated by the individual height Hp, and the container C gripped by the gripping unit 101 is stacked on the container C in the uppermost tier of the target container group Cg. In the example shown in FIG. 14, a container C that is to be in the fifth tier, which is an additional tier, is to be stacked on the container group Cg that includes four tiers of containers C. Therefore, after the gripping unit 101 is moved in the X and Y directions so as to match the individual position Cp of the container C in the fifth tier, the gripping unit 101 is lowered in the Z direction so as to match the individual height Hp of the container C in the fifth tier, and the container C gripped by the gripping unit 101 is stacked on the container C in the fourth tier that is the uppermost tier of the container group Cg. In this way, according to the present embodiment, it is possible to move the gripping unit 101 to an appropriate position according to the actual position and height of the each of the containers C in the tiers included in the container group Cg, and appropriately stack the container C.

Note that even when some of the containers C included in the target container group Cg are to be gripped by the gripping unit 101 and to be transported, it is possible to appropriately grip each of the containers C with the gripping unit 101, using the individual position Cp and the individual height Hp obtained as described above. In such a case, the control device 2 controls the movement mechanism 11 to adjust the position of the gripping reference point 10P of the gripping unit 101 in the X and Y directions so as to match the individual position Cp of the container C to be gripped, and thereafter instructs the lifting/lowering mechanism 12 to perform a lowering operation to lower the gripping unit 101 to the height that matches the individual height Hp of the container C to be gripped. Thus, the gripping unit 101 is moved to the position that is indicated by the individual position Cp, in the X and Y directions, and is the position in the Z direction indicated by the individual height Hp, and the gripping mechanism 10 is instructed to perform a gripping operation to grip the target container C. For example, when the container C in the fourth tier from the bottom in the container group Cg that includes four tiers of containers C is to be gripped, the gripping unit 101 is moved in the X and Y directions according to the individual position Cp of the container C in the fourth tier, thereafter the gripping unit 101 is lowered in the Z direction according to the individual height Hp of the container C in the fourth tier, and the container C in the fourth tier is gripped by the gripping unit 101. In this way, according to the present embodiment, it is possible to move the gripping unit 101 to an appropriate position according to the actual position and height of the each of the containers C in the tiers included in the container group Cg, and appropriately grip the container C.

With the above-described article storage facility 100, even when the container group Cg that includes a plurality of containers C in a stacked state is placed on the placement surface F in an inclined state, it is possible to stack a container C that is gripped by the gripping unit 101, on the container group Cg, or grip and transport some of the containers C included in the container group Cg using the gripping unit 101. That is to say, with the above-described article storage facility 100, it is possible to perform an appropriate transport operation on the container group Cg placed on the placement surface F in an inclined state.

As described above, in the present embodiment, the placement surface F is configured such that a plurality of container groups Cg thereon in the X and Y directions. In this example, the storage unit 22 stores container group position information Icgp regarding each of the plurality of container groups Cg placed on the placement surface F and tier number information In regarding each of the plurality of container groups Cg. Inclination computation processing and individual position computation processing are performed on the container group Cg selected by the control device 2 as a target to be transported.

Also, as described above, in the present embodiment, the placement surface F is configured such that a plurality of types of containers C that vary from each other in at least one of: the dimensions of the bottom surface; and the height Ch can be mounted thereon. In this example, the storage unit 22 stores bottom surface dimension information Is and height dimension information Ih regarding each of a plurality of types of containers C that vary from each other in at least one of: the dimensions of the bottom surface; and the height Ch, and type information that indicates the types of the containers C included in the container group Cg. The control device 2 acquires bottom surface dimension information Is and height dimension information Ih from the storage unit 22 based on the type information regarding the container group Cg selected as the target to be transported. That is to say, in the present embodiment, the control device 2 performs inclination computation processing and individual position computation processing according to the types of the containers C included in the container group Cg that is to be transported.

As described above, according to the present embodiment, even when a plurality of container groups Cg are placed on the placement surface F and when a plurality of types of containers C are included in the container groups Cg placed on the placement surface F, it is possible to appropriately perform inclination computation processing and individual position computation processing on each of the container groups Cg, and perform an appropriate transport operation on each of the container groups Cg. However, the placement inclination θ may be a large value due to a large inclination of the placement surface F, depending on the location where the container groups Cg are placed. In such a case, an error is more likely to occur in the transport operation performed by the transport device 1. Therefore, in the present embodiment, the control device 2 sets, in the placement surface F, an area where the placement inclination θ is no less than a predetermined value, as a prohibition area on which the container groups Cg are prohibited from being placed, based on the coordinate information Ic and the bottom surface dimension information Is stored in the storage unit 22. The predetermined value can be determined through experiments or the like, based on the gripping structure of the gripping unit 101 and the stability of the container groups Cg to be placed on the placement surface F. Such a predetermined value may set the inclination with respect to the vertical direction to be no less than 3°, for example. With the above-described configuration, only place container groups Cg that have a placement inclination θ that is less than the predetermined value can be placed on the placement surface F. The prohibition area may be used as, for example, a work area for workers to perform work, or a passage for workers.

Even in area that is not set as a prohibition area in the placement surface F, it may be unable to secure sufficient stability of the container group Cg depending on the height of the container group Cg, i.e., the dimension of the container group Cg in the direction orthogonal to the container group bottom surface Cgb, and the placement inclination θ. The dimension of the container group Cg in the direction orthogonal to the container group bottom surface Cgb is determined based on the height dimension Ch of each of the containers C in the tiers included in the container group Cg and the tier number n of the container group Cg. Therefore, in the present embodiment, the control device 2 may limit the tier number n of the container group Cg to be placed on the placement surface F, based on the placement inclination θ and the height dimension Ch of each of the containers C in the tiers included in the container group Cg. For example, the upper limit of the tier number n may be set based on the height dimension Ch so that the upper limit of the height of the container group Cg decreases as the placement inclination θ increases. Furthermore, the stability of the container group Cg may vary depending on the shape of the containers C, for example. In such a case, it is preferable that the control device 2 limits the tier number n of the container group Cg also based on type information that indicates the type of the containers C. It is preferable that the control device 2 limits the tier number n of the container group Cg as described above, considering the bottom surface inclination α determined by the dimensions of the container bottom surface that vary depending on the type of the containers C, or the height dimension Ch that varies depending on the type of the containers C.

Other Embodiments

Next, other embodiments of the article storage facility will be described.

Figure 15:
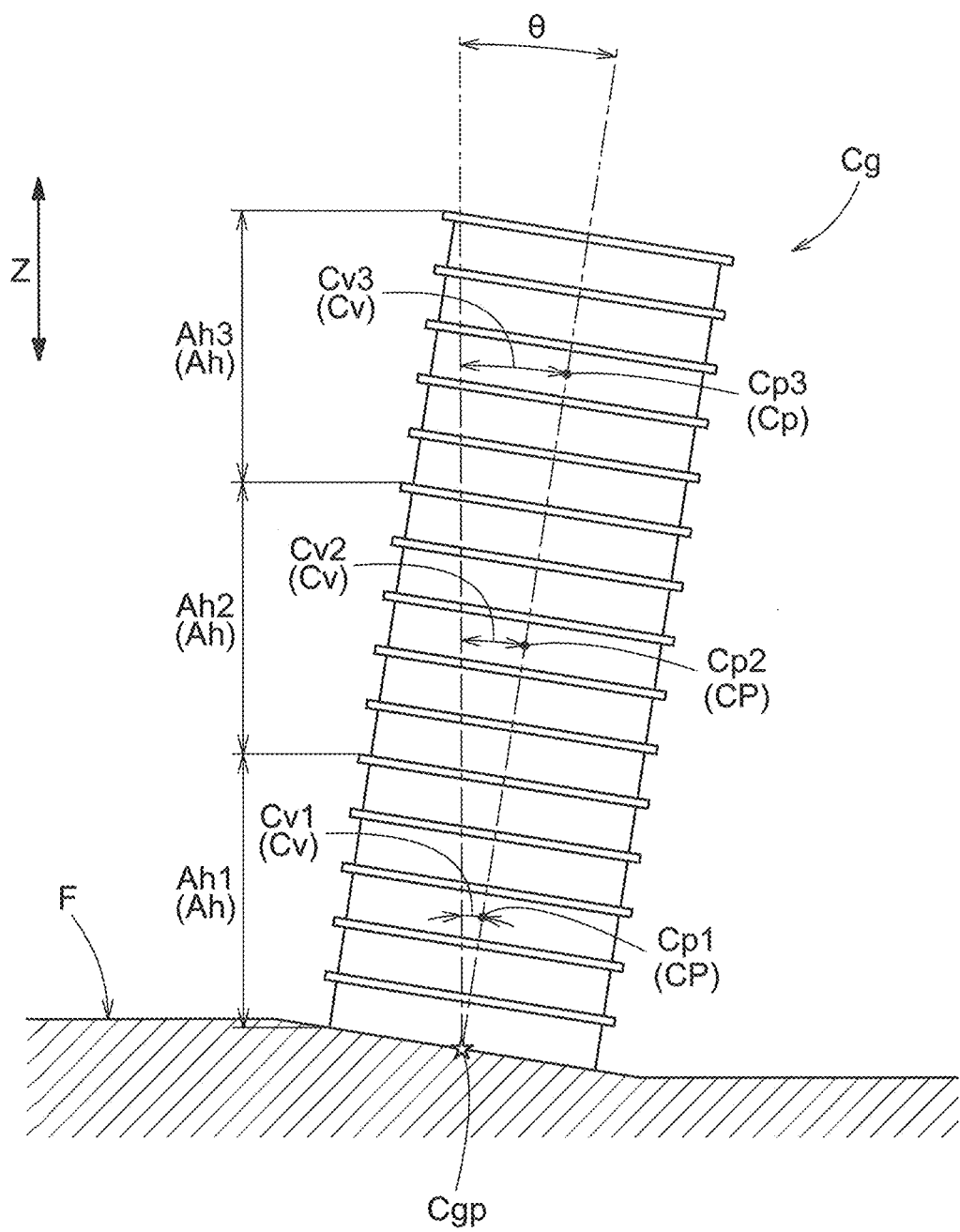
FIG. 15 is an illustration of a case in which the same correction value is computed for each of a plurality of height areas.

(1) The above embodiment describes an example in which the control device 2 obtains the individual position Cp and the correction value Cv for each of the containers C in the tiers included in the container group Cg. However, the present technique is not limited to such an example. As shown in FIG. 15, the control device 2 may divide the entire range of the container group Cg in the Z direction into a plurality of height areas Ah in the Z direction, and, in individual position computation processing, obtains individual-position information for each of the height areas Ah as a common value. That is to say, the control device 2 may obtain the individual position Cp and the correction value Cv for each of the height areas Ah. As a result, the control device 2 obtains the individual position Cp for each of the height areas Ah as a common value instead of obtaining the individual position Cp for each of the containers C in the tiers included in the container group Cg, and therefore it is possible to reduce the number of individual positions Cp to be obtained and reduce the computation load on the control device 2. In the example shown in FIG. 15, the container group Cg that includes fifteen tiers of containers C is placed on the placement surface F, and height areas Ah1 to Ah3 are each defined for five tiers. The control device 2, for example, determines the intermediate position of each height area Ah in the Z direction as the individual position Cp of all of the plurality of containers C arranged in the height area Ah (five containers C in the example shown in the drawing), and obtains the correction value Cv corresponding to this individual position Cp. In the example shown in the drawing, the control device 2 obtains individual positions Cp1 to Cp3 and correction values Cv1 to Cv3 for the plurality of height areas Ah1 to Ah3, respectively.

(2) The above embodiment describes, as an example, a configuration with which the control device 2 obtains individual height information that indicates the individual height Hp that is the position of each of the containers C in the tiers included in the container group Cg in the Z direction, based on the coordinate information Ic, the height dimension information Ih, and the container group position information Icgp stored in the storage unit 22, and controls the lifting/lowering mechanism 12 based on the individual height information. However, the present invention is not limited to such a configuration. For example, the control device 2 may obtain individual height information that indicates the individual height Hp that is the position of each of the containers C in the tiers included in the container group Cg, based on the placement inclination θ obtained through inclination computation processing, in addition to the coordinate information Ic, the height dimension information Ih, and the container group position information Icgp. As a result, the individual height Hp of the containers C are obtained in view of the placement inclination θ of the container group Cg as well, and therefore the individual height information can more accurately be acquired.

(3) The above embodiment describes an example in which the placement surface F is divided into a plurality of unit lots A, the position of each of the plurality of unit lots A in the Z direction is measured by the measurement device 3, and the position of each of the unit lots A in the Z direction is stored in the storage unit 22 as part of the coordinate information Ic. However, the present invention is not limited to such an example, and the position of each point in the Z direction measured by the measurement device 3 may be stored in the storage unit 22 as part of the coordinate information Ic, without dividing the placement surface F into a plurality of unit lots A. In this case, a point between measurement points that are adjacent to each other does not have measured position data in the Z direction. In such a case, it is preferable that the position in the Z direction of each point between measurement points that are adjacent to each other is obtained by performing linear interpolation on the position data in the Z direction of the two adjacent measurement points.

(4) The above embodiment describes an example of a configuration with which a plurality of types of containers C that vary from each other in at least one of: the dimensions of the bottom surface; and the height can be stored on the placement surface F. However, the present invention is not limited to such an example, and in the article storage facility 100, only the containers C of the same type may be stored on the placement surface F.

(5) Although the above embodiment describes an example in which the control device 2 sets the area in the placement surface F where the placement inclination θ is no less than a predetermined value, as a prohibition area on which the container groups Cg are prohibited from being placed, such a prohibition area need not necessarily be set.

(6) The configuration disclosed in the above-described embodiment may be applied in combination with the configurations disclosed in other embodiments. Regarding other configurations, all of the embodiments disclosed in the present description are merely exemplary in all respects. Therefore, various modifications can be made as appropriate without departing from the spirit of the present disclosure.

Overview of Above-described Embodiments

The following describes the above-described article storage facility.

A storage facility including: a transport device that transports a container; and a control device that controls the transport device, the article storage facility placing and storing a container group including a plurality of containers in a stacked state, on a placement surface that constitutes a storage location, wherein the control device includes a storage unit, the storage unit stores coordinate information that indicates an actual position of each of a plurality of points on the placement surface in an X direction, a Y direction, and a Z direction, bottom surface dimension information that indicates dimensions of the bottom surface of each of the containers in the X direction and the Y direction, height dimension information that indicates a height of each of the containers in the Z direction, container group position information that indicates the position of the container group in the X direction and the Y direction on the placement surface, and tier number information that indicates the number of tiers that is the number of containers included in the container group, where the X direction and the Y direction are directions that are parallel with a reference surface that is an ideal surface constituted by the placement surface, and are orthogonal to each other, and the Z direction is a direction that is orthogonal to the reference surface, the transport device includes a gripping unit that grips a single container or a plurality of containers in a stacked state, a movement mechanism that moves the gripping unit in the X direction and the Y direction, and a lifting/lowering mechanism that lifts and lowers the gripping unit in the Z direction, and the control device performs inclination computation processing to obtain a placement inclination that is an inclination of the container group placed on the placement surface relative to the Z direction, based on the coordinate information, the bottom surface dimension information, and the container group position information stored in the storage unit, and individual position computation processing to obtain individual-position information that indicates a position of each of the containers in the tiers included in the container group in the X direction and the Y direction, based on the container group position information, the placement inclination, and the height dimension information, and controls the movement mechanism based on the individual-position information.

With this configuration, when a container group is placed on any location of the placement surface, it is possible to grasp the position and the dimensions of the area of the placement surface occupied by the bottom surface of the container group, based on container group position information and bottom surface dimension information regarding the container group. In addition, the storage unit stores coordinate information regarding each of a plurality of points on the placement surface, more specifically information that indicates the actual positions of the plurality of points in the X, Y, and Z directions, and therefore it is possible to obtain the placement inclination that is an inclination of the container group placed on the placement surface relative to the Z direction, based on these pieces of information.

Here, the placement inclination is the inclination of the entire container group, and regarding the position in the X and Y directions, a displacement in the X and Y directions relative to the bottom surface of the container group increase in an upward direction. With the present configuration, individual position computation processing is performed to obtain individual-position information that indicates the position of each of the containers in the tiers in the X and Y directions based on the above-described placement inclination and container group position information, and height dimension information regarding each of the containers in the tiers included in the container group. As a result, it is possible to grasp the actual position of each of the containers in the tiers included in the container group in the X and Y directions, as individual-position information. Thereafter, by controlling the movement mechanism based on the individual-position information, it is possible to accurately move the gripping unit according to the actual position of each of the containers in the tiers included in the container group in the X and Y directions, to perform a transport operation. Therefore, with the present configuration, even when a container group including a plurality of containers in a stacked state is placed on the placement surface in an inclined state, it is possible to perform appropriate transport operation on the container group.

Here, it is preferable that, in the inclination computation processing, the control device obtains a container group bottom surface area that is an area in the placement surface occupied in the X direction and the Y direction by a container group bottom surface that is the bottom surface of the container in a lowermost tier of the container group, based on the container group position information and the bottom surface dimension information, obtains positions of a plurality of points on the container group bottom surface in the Z direction, based on the coordinate information regarding a plurality of points corresponding to the container group bottom surface area, obtains an inclination of the container group bottom surface based on the positions of the plurality of points on the container group bottom surface in the Z direction, and obtains the placement inclination based on the inclination of the container group bottom surface.

With this configuration, a container group bottom surface area that is an area of the placement surface occupied by the container group bottom surface is obtained, the inclination of the container group bottom surface is obtained based on the coordinate information corresponding to the container group bottom surface area, and the placement inclination is obtained based thereon. Therefore, the placement inclination can appropriately be obtained.

It is also preferable that the control device obtains individual height information that indicates a position of each of the containers in the tiers included in the container group in the Z direction, based on the coordinate information, the height dimension information, and the container group position information stored in the storage unit, and controls the lifting/lowering mechanism based on the individual height information.

With this configuration, it is possible to control the distance by which the lifting/lowering mechanism lifts/lowers the gripping unit according to the actual height at which each of the containers in the tiers included in the container group is located. Thus, it is possible to accurately move the gripping unit to each of the containers in the tiers included in the container group to perform a transport operation.

It is also preferable that the control device divides an entire range of the container group in the Z direction into a plurality of height areas in the Z direction, and, in the individual position computation processing, obtains the individual-position information for each of the height areas as a common value.

The placement surface is usually provided along a reference plane that is an ideal plane, variation in height at a plurality of points on the placement surface is minute in reality. Therefore, even when the container group has a placement inclination, the difference between containers that are adjacent to each other in the Z direction or containers that are located close to each other in the Z direction, of the containers in the tiers included in the container group, in position in the X and Y directions (individual-position information), is often minute. Also, such a minute difference in the position in the X and Y directions may be smaller than the operation accuracy of the movement mechanism for moving the gripping portion in the X and Y directions, and it is unnecessary to obtain detailed individual-position information regarding each of the containers in the tiers in such a case as well. With the present configuration, the control device obtains individual-position information for each height area as a common value, instead of obtaining the individual position for each of the containers in the tiers included in the container group, and therefore it is possible to reduce the computation load on the control device.

It is also preferable that the storage unit stores the container group position information regarding each of a plurality of container groups placed on the placement surface and tier number information regarding each of the plurality of container groups, and the inclination computation processing and the individual position computation processing are performed on a container group that is selected by the control device as a target to be transported.

With this configuration, it is possible to perform an accurate transport operation on each of the plurality of container groups placed at a plurality of points on the placement surface, in view of displacements in the X and Y directions caused by the placement inclination.

It is also preferable that the storage unit stores the bottom surface dimension information and the height dimension information regarding each of a plurality of types of containers that vary from each other in at least one of the dimensions of the bottom surface; and the height, and type information that indicates types of the containers included in the container group, and the control device acquires the bottom surface dimension information and the height dimension information from the storage unit based on the type information regarding the container group selected as a target to be transported.

With this configuration, even when a plurality of types of containers that vary from each other in at least one of: the dimensions of the bottom surface; and the height, are included in the container group, it is possible to appropriately perform inclination computation processing and individual position computation processing, using bottom surface dimension information and height dimension information regarding each of the plurality of types of containers, to perform an accurate transport operation.

It is also preferable that the control device sets, in the placement surface, an area where the placement inclination is no less than a predetermined value, as a prohibition area on which the container group is prohibited from being placed, based on the coordinate information and the bottom surface dimension information stored in the storage unit.

With this configuration, an area where the placement inclination is no less than a predetermined value in the placement surface is set as a prohibition area on which a container group is prohibited from being placed. Therefore, it is possible to realize a state in which only container groups whose placement inclination is less than the predetermined value are placed on the placement surface. Therefore, it is possible to suppress the placement inclination of the container groups to increase stability, and make it less likely that an error occurs in a transport operation. Note that the prohibition area may be used as, for example, a work area for workers to perform work, or a passage for workers.

INDUSTRIAL APPLICABILITY

The technique according to the present disclosure is applicable to an article storage facility including: a transport device that transports a container; and a control device that controls the transport device, the article storage facility placing and storing a container group including a plurality of containers in a stacked state, on a placement surface that constitutes a storage location.

DESCRIPTION OF REFERENCE SIGNS

100: Article Storage Facility
1: Transport Device
2: Control Device
11: Movement Mechanism
12: Lifting/Lowering Mechanism
22: Storage Unit
101: Gripping Unit
Af: Container Group Bottom Surface Area
Ah: Height Area
C: Container
Cg: Container Group
Cgb: Container Group Bottom Surface
Cgp: Container Group Position
Ch: Height Dimension
Cp: Individual Position
F: Placing Surface
Fs: Reference Surface
n: Tier Number
θ: Placement Inclination
Ic: Coordinate Information
Is: Bottom Surface Dimension Information
Ih: Height Dimension Information
Icgp: Container Group Position Information
In: Tier Number Information
Icp: Individual-position information
Ihp: Individual Height Information
It: Type Information

What is claimed is:

1. A storage facility comprising:
a transport device that transports a container; and
a control device controlling the transport device, the article storage facility configured for placing and storing a container group that includes a plurality of containers in a stacked state on a placement surface that constitutes a storage location,
wherein:
the control device comprises a storage unit, and
the storage unit stores:
coordinate information that indicates an actual position of each of a plurality of points on the placement surface in an X direction, a Y direction, and a Z direction;
bottom surface dimension information that indicates dimensions of the bottom surface of each container in the X direction and the Y direction;
height dimension information that indicates a height of each container in the Z direction;
container group position information that indicates the position of the container group in the X direction and the Y direction on the placement surface; and
tier number information that indicates the number of tiers that is the number of containers included in the container group,
wherein the X direction and the Y direction are directions that are parallel with a reference surface that is an ideal surface constituted by the placement surface and are orthogonal to each other, and the Z direction is a direction that is orthogonal to the reference surface,
wherein the transport device includes a gripping unit that grips a single container or a plurality of containers in a stacked state, a movement mechanism that moves the gripping unit in the X direction and the Y direction, and a lifting/lowering mechanism that lifts and lowers the gripping unit in the Z direction,
wherein the control device performs inclination computation processing to obtain a placement inclination that is an inclination of the container group placed on the placement surface relative to the Z direction based on:
the coordinate information;
the bottom surface dimension information; and
the container group position information stored in the storage unit, and
wherein the control device further performs individual position computation processing to obtain individual position information that indicates a position of each of the containers in the tiers included in the container group in the X direction and the Y direction based on:
the container group position information;
the placement inclination; and
the height dimension information,
and controls the movement mechanism based on the individual position information.

2. The article storage facility according to claim 1, wherein, in the inclination computation processing, the control device:
obtains a container group bottom surface area that is an area in the placement surface occupied in the X direction and the Y direction by a container group bottom surface that is the bottom surface of the container in a lowermost tier of the container group based on the container group position information and the bottom surface dimension information, obtains positions of a plurality of points on the container group bottom surface in the Z direction based on the coordinate information regarding a plurality of points corresponding to the container group bottom surface area, obtains an inclination of the container group bottom surface based on the positions of the plurality of points on the container group bottom surface in the Z direction, and obtains the placement inclination based on the inclination of the container group bottom surface.

3. The article storage facility according to claim 2,
wherein in the inclination computation processing, the inclination of the container group bottom surface is obtained based on positions of at least three points on the container group bottom surface in the Z direction.

4. The article storage facility according to claim 1,
wherein the control device obtains individual height information that indicates a position of each of the containers in the tiers included in the container group in the Z direction based on the coordinate information, the height dimension information, and the container group position information stored in the storage unit, and controls the lifting/lowering mechanism based on the individual height information.

5. The article storage facility according to claim 1,
wherein the control device divides an entire range of the container group in the Z direction into a plurality of height areas in the Z direction and, in the individual position computation processing, obtains the individual position information for each of the height areas as a common value.

6. The article storage facility according to claim 1,
wherein the storage unit stores the container group position information regarding each of a plurality of container groups placed on the placement surface and tier number information regarding each of the plurality of container groups, and
wherein the inclination computation processing and the individual position computation processing are performed on a container group that is selected by the control device as a target to be transported.

7. The article storage facility according to claim 1,
wherein the storage unit stores the bottom surface dimension information and the height dimension information regarding each of a plurality of types of containers that vary from each other in at least one of:
the dimensions of the bottom surface; and
the height and type information that indicates types of the containers included in the container group, and
wherein the control device acquires the bottom surface dimension information and the height dimension information from the storage unit based on the type information regarding the container group selected as a target to be transported.

8. The article storage facility according to claim 1,
wherein the control device sets, in the placement surface, an area where the placement inclination is no less than a predetermined value as a prohibition area on which the container group is prohibited from being placed, based on the coordinate information and the bottom surface dimension information stored in the storage unit.

* * * * *